US009076134B2

(12) United States Patent
Grovit et al.

(10) Patent No.: US 9,076,134 B2
(45) Date of Patent: Jul. 7, 2015

(54) COMPUTERIZED MONEY TRANSFER SYSTEM AND METHOD

(75) Inventors: Felix Grovit, Brussels (BE); Neel Vichhi, Romford (GB); Stefan Carim Ismail Grovit, London (GB)

(73) Assignee: Chequepoint Franchise Corporation, Panama city (PA)

( * ) Notice: Subject to any disclaimer, the term of this patent is extended or adjusted under 35 U.S.C. 154(b) by 2240 days.

(21) Appl. No.: 09/978,849

(22) Filed: Oct. 15, 2001

(65) Prior Publication Data

US 2003/0074310 A1    Apr. 17, 2003

(51) Int. Cl.
*G06Q 40/00* (2012.01)
*G06Q 20/10* (2012.01)
(Continued)

(52) U.S. Cl.
CPC ............... *G06Q 20/10* (2013.01); *G06Q 20/04* (2013.01); *G06Q 20/108* (2013.01); *G06Q 40/00* (2013.01);
(Continued)

(58) Field of Classification Search
CPC ....... G06Q 20/10; G06Q 40/00; G06Q 20/18; G06Q 20/108; G06Q 20/04; G06Q 20/381; G06Q 40/02
USPC .................................. 705/39, 40, 76, 379, 35
See application file for complete search history.

(56) References Cited

U.S. PATENT DOCUMENTS 5,448,043 A    9/1995 Nakano et al.
5,650,604 A *  7/1997 Marcous et al. ............. 235/379
(Continued)

FOREIGN PATENT DOCUMENTS

EP          0910840       4/1999
WO      WO-01/09850 A1   2/2001
(Continued)

OTHER PUBLICATIONS

Marina Lee, F. T., Nie, F. L., Ong, H. P., & Tew, P. Y. (1999). Money laundering and banking practices. Singapore Management Review, 21(1), 1. Retrieved Feb. 23, 2015.*
(Continued)

*Primary Examiner* — Kito R Robinson
(74) *Attorney, Agent, or Firm* — Arash Behravesh; Mannava & Kang, P.C.

(57) ABSTRACT

A computerized money transfer system implements a money transfer service for trasferring money from a sending entity to at least one receiving entity. A plurality of agent terminals operable by agents of the money transfer service are interconnected by a communications network. A money transfer control system is connected to the communications network for controlling the implementation of the money transfer service. The money transfer control system includes an agent account data store storing account data for each agent and a transaction data store storing transaction data for transactions by agents implementing money transfers from a sending entity to at least one receiving entity. When data is input to an agent terminal by a sending agent instigating a money transfer requested by a sending entity to at least one receiving entity, the data is transmitted to the money transfer control system. The input data identifies the sending and receiving entities, sending agent and at least one receiving agent that is to remit the money transferred thereto to the or each receiving entity. The money transfer control system records the input data in the transaction data store as a transaction from a sending agent to at least one receiving agent for a sending entity and at least one receiving entity and updates the agent account data in the agent account data store for the sending and receiving agents.

60 Claims, 9 Drawing Sheets

(51) Int. Cl.
*G06Q 20/04* (2012.01)
*G06Q 20/00* (2012.01)
*G06Q 20/38* (2012.01)
*G06Q 40/04* (2012.01)
*G06Q 40/02* (2012.01)
*G06Q 20/18* (2012.01)

(52) U.S. Cl.
CPC ............. *G06Q 40/02* (2013.01); *G06Q 20/18* (2013.01); *G06Q 20/00* (2013.01); *G06Q 20/381* (2013.01); *G06Q 40/04* (2013.01)

(56) References Cited

U.S. PATENT DOCUMENTS

| | | | |
|---|---|---|---|
| 5,774,553 A * | 6/1998 | Rosen | 705/68 |
| 5,825,003 A | 10/1998 | Jennings et al. | |
| 5,897,621 A | 4/1999 | Boesch et al. | |
| 6,205,433 B1 | 3/2001 | Boesch et al. | |
| 6,424,706 B1 * | 7/2002 | Katz et al. | 379/144.01 |
| 6,488,203 B1 * | 12/2002 | Stoutenburg et al. | 235/379 |
| 6,505,177 B1 * | 1/2003 | Drummond et al. | 705/43 |
| 6,554,184 B1 * | 4/2003 | Amos | 235/379 |
| 6,736,314 B2 * | 5/2004 | Cooper et al. | 235/380 |
| 6,938,013 B1 * | 8/2005 | Gutierrez-Sheris | 705/39 |
| 7,376,587 B1 * | 5/2008 | Neofytides et al. | 705/26.35 |
| 7,606,734 B2 * | 10/2009 | Baig et al. | 705/26.35 |
| 7,742,984 B2 | 6/2010 | Mohsenzadeh | |
| 7,949,600 B1 * | 5/2011 | Portillo et al. | 705/39 |
| 2002/0016763 A1 * | 2/2002 | March | 705/39 |
| 2002/0062280 A1 * | 5/2002 | Zachariassen et al. | 705/39 |
| 2002/0077971 A1 * | 6/2002 | Allred | 705/39 |
| 2002/0087462 A1 * | 7/2002 | Seifert et al. | 705/39 |
| 2002/0099656 A1 * | 7/2002 | Poh Wong | 705/40 |
| 2002/0111908 A1 * | 8/2002 | Milberger et al. | 705/44 |
| 2002/0152176 A1 * | 10/2002 | Neofytides et al. | 705/64 |
| 2002/0161707 A1 * | 10/2002 | Cole et al. | 705/42 |
| 2002/0185529 A1 * | 12/2002 | Cooper et al. | 235/380 |
| 2002/0195486 A1 * | 12/2002 | Erb et al. | 235/379 |
| 2003/0028492 A1 * | 2/2003 | Levenson et al. | 705/64 |
| 2003/0046224 A1 * | 3/2003 | Mujtaba et al. | 705/39 |
| 2003/0208440 A1 * | 11/2003 | Harada et al. | 705/39 |

FOREIGN PATENT DOCUMENTS

| | | |
|---|---|---|
| WO | WO-01/11524 A1 | 2/2001 |
| WO | WO-03/034353 A2 | 4/2003 |

OTHER PUBLICATIONS

Labaton, S. (Aug. 28, 1989). Slick money launderers find system easy to beat. St.Petersburg Times Retrieved Feb. 23, 2015.*

Labaton, S. (Aug. 27, 1989). Electronic banking makes laundering drug money easy. Austin American Statesman Retrieved Feb. 23, 2015.*

By, M. L. (Jul. 16, 1985). Federal bank examiners are drawing fire—penn square, continental Illinois raise questions about U.S. staff. Wall Street Journal Retrieved from Feb. 23, 2015.*

* cited by examiner

COMPUTERIZED MONEY TRANSFER SYSTEM AND METHOD

FIELD OF THE INVENTION

The present invention relates to a computerized money transfer method and system.

BACKGROUND OF THE INVENTION

There are many services available for the transfer of money from a sender to a receiver. One method offered by money transfer companies requires a sender to enter an office of the company in order to request the sending of money to a receiver, e.g. overseas. One office local to the receiver is identified and the money is transferred to that office. When the money reaches the office, the receiver can go to the office and withdraw the money, e.g. as cash or a cheque. The problem with this system is that there is a considerable time delay between the ordering of the transfer of the money and the actual receipt of the money. This method does however have the advantage of not requiring a sender to have an account with the institution through which the money is being transferred.

Another method by which money can be transferred is by transfer of funds between accounts, e.g. between bank accounts. Whilst this method of transferring funds can be last, it requires a sender and a receiver to have an account with the financial organization involved in the transfer.

SUMMARY OF THE INVENTION

It is thus an object of the present invention to provide a simplified and efficient money transfer system and method.

The first aspect of the present invention provides a computerized money transfer system and method for implementing a money transfer service for transferring money from a sending entity such as an individual or company to at least one receiving entity such as a person or company. A plurality of agent terminals are provided which are operated by agents of the money transfer service. The agent terminals are interconnected by a communications network which can comprise any conventional communications network, e.g. a wired network such as the Internet, or a wireless network. Connected to the network is a money transfer controller for controlling the implementation of the money transfer service. Agents are registered with the money transfer controller plus account data for each agent is stored in the money transfer controller. A transaction data store is also provided to store transaction data for transactions by agents implementing money transfers from senders to receivers.

In order to initiate a money transfer, an agent terminal is used by an agent to input data which identifies the sender, the or each receiver, the sending agent and at least one receiving agent. The data will also indicate the amount of money to be transferred. The input data is received by the money transfer controller and a transaction data record is stored in the transaction data store. Also as a result of the transaction the agent account data for the sending agent is updated based on the transaction.

Thus in accordance with this embodiment of the present invention, a money transfer system is provided which does not require the sending entity or receiving entity to have an account. The sending entity can simply instruct an agent of the money transfer service to make the transfer which is reflected in the agent's account. Thus the money transfer system is based on a network of agents each of which register with the service and have accounts for the service. All transactions implemented by an agent accrues to their account, thus in this way a convenient money transfer service is provided having a network of agents enabling entities to transfer money therebetween without having a relationship with the money transfer service or between themselves.

In one embodiment, the money transfer system can enable the transfer of money to be currency independent. A sending currency need not be the same as the receiving currency. In this embodiment the money transfer controller includes exchange rate data enabling the conversion of currencies. This enables not only the sending currency and receiving currency to be different, based on the exchange rate, but also it enables the agent's account data to be in the agent's local currency based on the exchange rate data involved in accumulated transactions. The currency exchange can be direct or indirect via at least one intermediate currency.

In another embodiment of the present invention the money transfer controller includes a transaction monitor for monitoring transactions. This enables transactions that fit a predetermined criteria, e.g. comprise suspicious or irregular transactions, to require further information from the sender. The requirement for further information for suspicious or irregular transactions is a function of money laundering compliance regulations. The provision of additional information by the sender helps money laundering regulation officers to detect potential money laundering operations. On the basis of the input of further information, the money transfer controller can block the transaction automatically if it is determined that stored money laundering compliance regulations are contravened.

In addition to or instead of the monitoring and use of further data, a transaction can be monitored against predetermined criteria to determine whether to allow the transaction. For example, the transaction can be compared with money laundering compliance regulations to determine whether they are contravened and if so to block the transaction. Alternatively, or in addition, the transactions can be monitored and used in conjunction with the agent's account data in order to determine whether the transaction should proceed. For example, if the transaction would cause a change in the agent's account data outside predetermined criteria, the transaction can be blocked. This provides for automatic credit control, for example allowing the blocking of transactions until the agent's account is improved, e.g. by payment of some of the outstanding debt incurred as a result of previous transactions.

In one embodiment of the present invention, because the agent's account data and transaction data is stored centrally, this enables the netting off of agents' accounts for agents against other agents. Agents have access to their accounts and can monitor and control their accounts.

In one embodiment of the present invention a money transfer controller provides an interface to allow agents to register as master agents and to register other agents as sub-agents. When an agent registers sub-agents, they accept responsibility for the transactions of those sub-agents. Thus the account data for these sub-agents is linked to the account data of the master agent and in this way all transactions by sub-agents are to some extent controlled by the master agent. The organization of sub-agents and master agents can be hierarchical and thus sub-agents themselves can be master agents for their own sub-agents. However, if a master agent is also a sub-agent, then the financial activities of the sub-agents of a master agents who is also a sub-agent are the responsibility of the master agent at the top of the hierarchical tree.

In one embodiment where a master agent has registered sub-agents, the transfer terminal operated by the master agent can include a domain money transfer controller to control the implementation of the money transfer service between agents in a set of agent terminals operated by agents registered as sub-agents of the master agent. The domain money transfer controller also includes domain agent account data for the set of agents and domain transaction data for transactions between agents in the set of agents. This embodiment of the present invention provides for a hub- and spoke-type money transfer system in which sub-agents can transfer money to other sub-agents of the same master agent or the master agent using the domain money transfer controller implemented on the agent terminal operated by the master agent. Thus money transfers between sub-agents and the master agent can take place on a local basis without need to refer to the main hub money transfer controller.

In one embodiment of the present invention the input transaction data from an agent terminal identifies a sender and a plurality of receivers. In other words the data represents a combined transaction aimed at a number of recipients. This enables a sender to make a single request to an agent to send different amounts in different currencies to different recipients in a single transaction with the agent. This simplifies the transaction with the agent and within the money transfer controller, the transaction data can be stored as a single sending transaction indexed for the sending entity and/or as a plurality of receiving transactions indexed for each receiving entity. Alternatively, or in addition, the transaction data for the transaction can comprise a single sending transaction indexed for the sending agent and a plurality of receiving transactions indexed for each receiving agent In a preferred embodiment of the present invention, the money transfer system comprises a web-based service implemented over an Internet Protocol (IP) network such as the Internet. The money transfer controller comprises a web server system accessible by the agent terminals using a web interface. The agent terminals comprise computers implementing web browser application to enable access to the web interface of the server system.

In one embodiment of the present invention, to avoid the need for senders who use the money transfer service regularly from having to repeatedly enter personal data, a sender can be provided with a device such as a smartcard or other data storage device which can be read at an agent terminal to automatically input data identifying the sender.

In accordance with another aspect of the present invention, there is provided a computerized money transfer system and method implementing a money transfer service for transferring money from a sender to a plurality of receivers in which a plurality of terminals are interconnected by a communications network. A money transfer controller is connected to the communications network for controlling the implementation of the money transfer service. The money transfer controller includes a transaction data store storing transaction data for transactions implementing money transfers from a sender to the receivers. Data is input at a terminal to instigate a money transfer from a sender to at least one receiver. The data is transmitted from the terminal to the money transfer controller. The data identifies the sender and the receivers and the money transfer controller records the data in the transaction data store as a transaction from a sender to the plurality of receivers. The money transfer controller also apportions the transaction to each receiver and sends data identifying the apportionment for respective receivers to at least one terminal to enable the completion of the money transfer to the respective receivers.

Thus in accordance with this aspect of the present invention, a sender is able to complete a single transaction at a terminal of the money transfer system in which the transaction requires the transfer of money to more than one receiver who can be located at more than one terminal. Thus although the money transfer controller can store a single transaction for the sender, this must be apportioned appropriately for each receiver to ensure that the money aimed at the receiver is sent to a terminal to enable the completion of the money transfer.

In this embodiment of the present invention, the terminals can be operated by the senders and receivers to provide a simple method of transferring funds simultaneously from one sender to multiple receivers in one transaction.

In another embodiment of the present invention, the terminals are operated by agents of the money transfer service. The agents are registered with the service and have accounts against which the transactions are record. The senders therefore contact agents and make arrangements for payment of agents to send money to receivers. Receiving agents are identified for receivers and the money is made available immediately by the or each receiving agent operating agent terminals for collection by the receivers.

In one embodiment the money transfer controller stores the input data as a single transaction indexed by the sender.

In another embodiment of the present invention, the money transfer controller is adapted to store the input data as a plurality of associated transactions associated by the sender and indexed by the receiver.

Another aspect of the present invention provides a computerized hub and spoke money transfer system implementing a money transfer service for transferring money from a sender to at least one receiver. The system comprises a plurality of agent terminals that are operable by agents of the money transfer service. The agent terminals are interconnected by a communications network to which is connected a hub money transfer controller for controlling the implementation of the money transfer service between unrelated agents. Related agents comprise daughters of a common parent agent. The hub money transfer control system also includes a transaction data store storing transaction data for transactions between unrelated agents implementing money transfers from a sending to at least one receiver, and an agent data store containing agent relationships identifying a hierarchy of parent and daughter agents.

At least one agent terminal operable by a parent agent comprises a spoke money transfer controller for controlling the implementation of the money transfer service for money transfers between related agents. The spoke money transfer controller also comprises a local transaction data store storing transaction data for transactions between related agents implementing money transfers from a sender to at least one receiver, and an agent data store storing agent relationships identifying a hierarchy of parent and daughter agents.

When data is input at a terminal by a sending agent instigating a money transfer at the request of a sender to at least one receiver, the data input identifies the sender and receiver, the sending agent, and at least one receiving agent that is to remit the money transferred thereto to the or each receiver. The input data is transmitted to either the hub money transfer controller or the spoke money transfer controller. The data is transmitted to the hub money transfer controller if a receiving agent identified in the data is not related to the sending agent. The hub money transfer controller records the input data in the transaction data store as a transaction from a sending agent to at least one receiving agent for a sender and at least one receiver, and transmits information on all transactions to the or each agent terminal operated by the or each receiving agent.

If the data is sent to the spoke money transfer controller, the spoke money transfer controller records the input data in the local transaction data store as a transaction from a sending agent to at least one receiving agent for a sender and at least one receiver, and transmits information on the transaction to the or each agent terminal operated by the or each receiving agent.

Thus in accordance with this aspect of the present invention, it is possible for spoke money transfer controllers to handle money transfers between related agents who are either the agent operating the spoke money transfer controller, or sub-agents thereof. This provides for more distributed processing of money transfers and enables transfers within a domain to be handled locally without having to utilize a central hub money transfer controller.

In accordance with this aspect of the present invention, it is possible for transactions to be handled locally by the spoke money transfer controller because the agent operating the spoke money transfer controller has control over the sub-agents within the domain and the operator of the spoke money transfer controller takes ultimate responsibility for the financial transactions between its sub-agents.

In one embodiment of the present invention, to ensure that the hub money transfer controller contains a complete picture of all transactions taking place within the money transfer control service, the hub money transfer controller includes transaction data synchronization means for synchronizing the transaction data in the transaction data store in the hub money transfer controller with the transaction data store in the spoke money transfer controller.

Another aspect of the present invention provides A hub and spoke money transfer system implementing a money transfer service for transferring money from a sender to at least one receiver, the system comprising: a plurality of money transfer agent terminals operable by money transfer agents; a hub money transfer controller for controlling the transfer of money between unrelated agents; at least one spoke money transfer controller for controlling the transfer of money between related agents; wherein the agent terminals, the spoke money transfer controller and the hub money transfer controller communicate over a communications network.

The present invention can be implemented using dedicated processing equipment, or programmable processing equipment such as suitably programmed general purpose computers. Further, the present invention can be implemented by a single processing apparatus or a number of networked processing apparatuses networked by any conventional communications network. The present invention can thus be implemented by suitably programming a computer. Therefore, the present invention encompasses computer program code for controlling a processing apparatus to implement the method of the present invention The computer program can be embodied on any suitable carrier medium supplied to a processing apparatus such as a transient carrier medium, e.g. an electrical, optical, microwave, rf, or acoustic signal (an example being a TCP/IP signal carrying computer code over an IP network such as the Internet), or a storage medium such as a floppy disk, hard disk, tape device, CD-ROM, or solid state memory device.

DETAILED DESCRIPTION OF PREFERRED EMBODIMENTS

Figure 1:
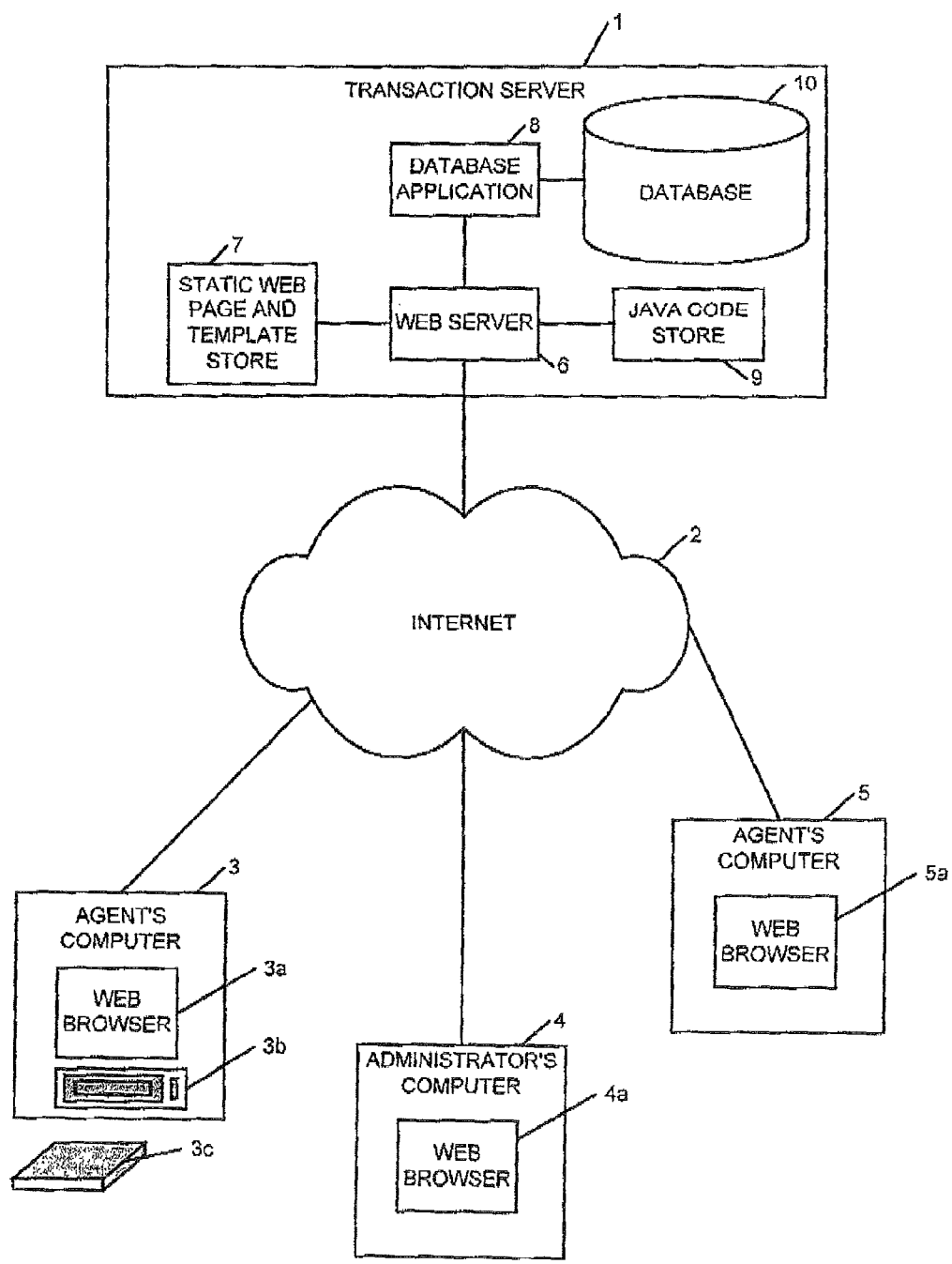
FIG. 1 is a schematic diagram of a money transfer system in accordance with an embodiment of the present invention.

FIG. 1 is a schematic diagram of a money transfer system in accordance with an embodiment of the present invention. In this embodiment a transaction server 1 implements the money transfer control function and this is connected over the Internet to a first agents computer 3 and a second agent's computer 5. The first agent's computer 3 implements a web browser 3a and is provided with a device reader 3b for receiving a device 3c from a sender who wishes to send money to a receiver. Thus the agent implementing the agent's computer 3 acts as a sending agent for a sender. The device 3c can comprise any conventional storage device such as a smartcard, magnetic card, or other solid state device. The device 3c can store personal information for a sender who is a regular user of the money transfer service to avoid the user having to manually provide their personal data every time they wish to instruct the sending agent to instigate a money transfer. The sending agent operating the agent's computer 3 will receive payment from the sender in respect of the money to be transferred to a receiver. The agent's computer 3 communicates with the transaction server 1 in order to provide the money transfer as will be described in more detail hereinafter. The transaction server 1 is also connected over the Internet to a second agents computer 5, which in this example is operated by an agent designated as the receiving agent. The receiving agent's computer 5 is located in an office which is conveniently accessible to the recipient of the transferred money. The agent's computer 5 implements a web browser 5a for implementing communications over the Internet 2 to the transaction server 1. Thus data instructing the transfer of money is transferred from the sending agent's computer 3 upon payment by the sender to the receiving agents computer 5, whereupon the receiving agent will pay the receiver. Thus this system enables a sender to go to the offices of the sending agent and pay in cash or any convenient payment method accepted by the sending agent whereupon an instruction is sent to the receiving agent's computer to pay the receiver and the receiving agent will pay the receiver when they present themselves in the receiver's office in any convenient form, e.g. cash or cheque. The instruction between the sending agent and the receiving agent for the payment to the sender is almost instantaneous. There is no need to await the transfer of the funds. Credit is thus extended between the receiving and sending agents. This is reflected in their accounts which are stored within the transaction server 1 in database 10 as will be described in more detail hereinafter.

The transaction server 1 in this embodiment of the present invention comprises a web-based service implemented by a web server 6 provided web page interfaces to web browsers 3a and 5a on the sending agent's computer 3 and the receiving agent's computer 5 respectively. The web server 6 in the transaction server 1 is provided with Java code in a Java code store 9 for the generation of appropriate web pages. Also, static web pages and web page templates are provided in a static web page and template store 7. A database application 8 is provided to interface the web server 6 to a database 10 in which is stored agents' account information and transaction information as will be described in more detail hereinafter.

It can thus be seen from FIG. 1 that the present invention provides a web-based system which enables the money transfer system to be provided globally to a global network of agents using the readily available Internet. Connections between computers over the Internet should be secure and can be implemented either by using the secure socket layer (SSL) or by implementing a virtual private network (VPN) between the computers.

In addition to agents acting as sending and receiving agents, the system provides for an administrative interface to provide administrative functions. In FIG. 1, there is illustrated an administrator's computer 4 which is also provided with a web browser 4a to access web pages provided by the web server 6 to provide an administrator's interface to the information in the database 10.

Figure 2:
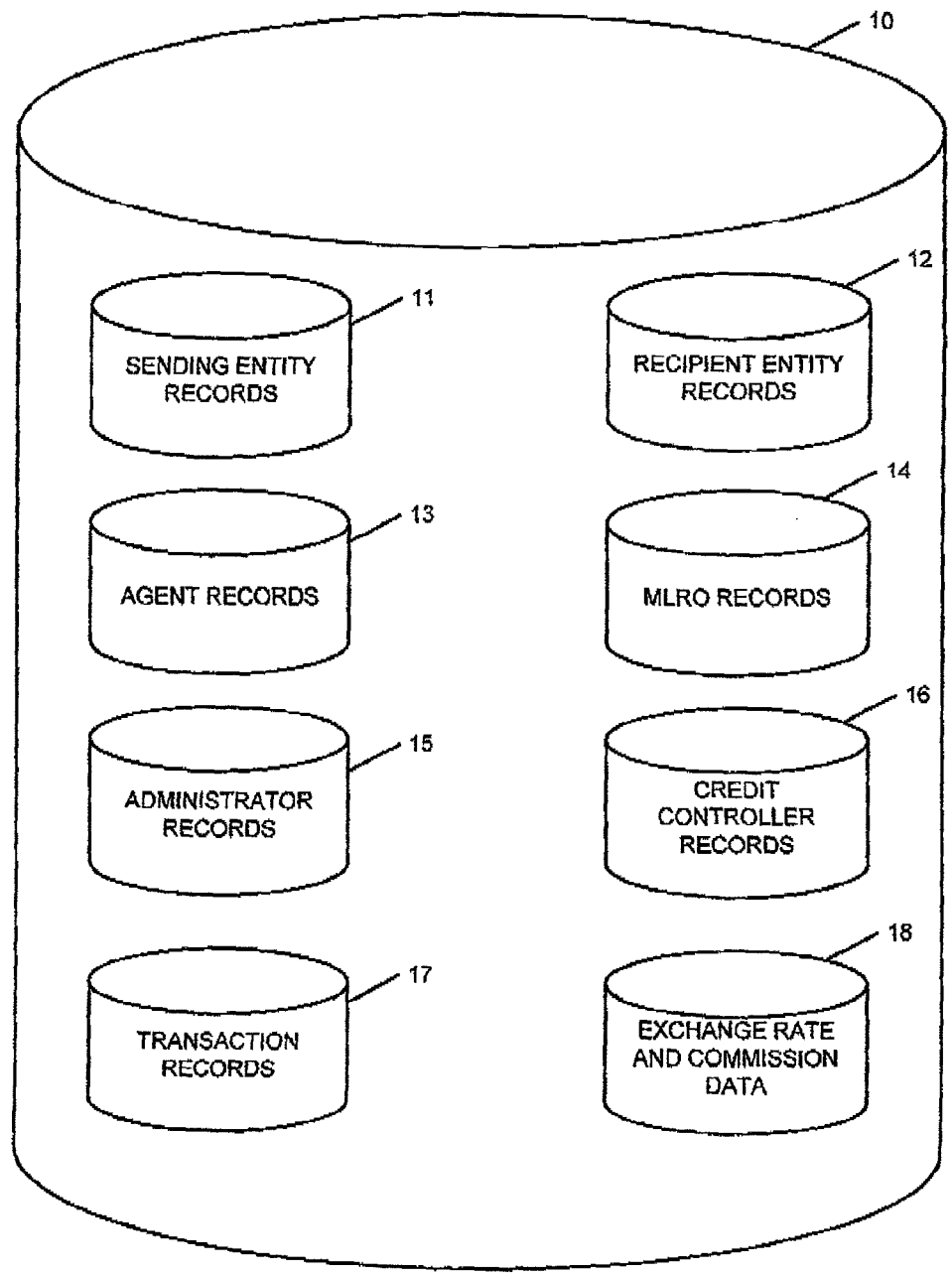
FIG. 2 is a schematic diagram of the data provided in the database in the embodiment of FIG. 1.

FIG. 2 illustrates the content of the database 10 in the transaction server 1 in more detail.

Within the database 10 there is stored sending entity records 11. The sending entity represents the customer of the service. The records contain customer information. Each sending entity or customer is given a customer number. For each customer number the customer's name, address, contact details such as telephone number, fax number and e-mail are entered together with date or birth, age, and sex. Also the records can indicate whether the records are active or inactive to allow for an administrator to bar the customer. The records can also store a list of recipients, by recipient numbers to whom the sender has sent money before.

Database 10 also includes recipient entity records 12. The recipient entity records 12 contain information on the recipients of the money transfers by customers. Each recipient is given a recipient number and the recipients personal details such as name, age, date or birth, sex, address, etc., is stored as a record. Also for each recipient, the agent number for the receiving agent they used to receive the money is stored.

Database 10 also includes agent records 13 which comprise a record for each agent. Each agent is given an agent number or ID. The agent number or ID can indicate the type of agent. For example, an agent can be a master agent or a sub-agent. The agent ID will indicate whether the agent has been registered as a sub-agent since the ID will include the ID of the parent. A parent and child relationship can either be indicated by the agent ID, or by relationships within the database. The agent record will also indicate the type of agent, for example whether it is a sending agent a receiving agent, or both a sending and receiving agent. The ability to send and receive money can be governed by local money transfer regulations. The agent record also includes the agent name, address (location), and contact details. For security, the Internet Protocol (IP) address of the agents computer can also be stored in an agent record so that the IP address of the computer used during a money transfer can be checked to ensure that the communication during money transfer is to the agent's computer and not to a hacker. The agent record will further include security details such as username and passwords. If the agent is an organization, there may be an organization password which provides a certain level of access and each operator can be provided wit an individual password which provides a lower level of access. The level of access can govern the level of administrative access enabled to the information within the database. The agent record further stores credit limit information indicating the level of credit allowed for the agent and/or deposit information indicating the level of funds deposited by the agent. Further in the agent record the commission type or split to be earned by the agent for money transfers can be indicated to enable separate types of commission or separate commission splits to be used for different agents. For example, where an agent generates a high volume of business, a special commission type or split may be negotiated for that agent. The agent record further stores an indication of whether the agent record is active or inactive to allow for an administrator to bar the agent should that be required.

The database 10 also stores money laundering regulation officer (MLRO) records 14. An MLRO record is provided for each MLRO. Typically each country will require a MLRO who has knowledge of the money laundering compliance regulations of that country to enable them to update the records when necessary The MLRO record stores regulatory information, statutory limits for transactions, internal limits for transactions together with username and password information.

The database 10 further contains administrator records 15. The administrator records comprise a record for each administrator who has access to information in the database. The record for an administrator comprises an administrator number, an administrator level indicating the level of access permitted to the administrator, the geographical region for which the administrator is responsible, and the username and password information for the administrator.

The database 10 further contains credit controller records 16. Each credit controller is provided with a record having a credit controller number, an indication of the region for which the credit controller is responsible, and the username and password for the credit controller. This enables credit controllers to look at agents' accounts to perform their credit control responsibilities in respect of the regions for which they have responsibility.

The database 10 further stores transaction records. A transaction record is created for each transaction or money transfer that takes place. A transaction record comprises a transaction number unique to the transaction, the sender number, the receiver number or numbers, the sending agent number, the receiving agent or agents, the principal sum, i.e. the amount paid by the sender, the amount to be paid to the or each receiver, the commission charged for the transaction, the sending and receiving currencies, the actual and realized exchange rates (the actual exchange rate representing the exchange rate used by the sending agent to calculate the amount to be paid to the receiver in relationship to the actual amount paid by the sender, whereas the realized exchange rate represents the exchange rate at the time of settlement of the transaction with the sending agent). The transaction record can also include an indication of whether the transaction is a suspicious or irregular transaction or not. If the transaction is a suspicious or irregular transaction, the transaction record can include either the additional transaction data which is required to be entered by the sender or a pointer to the additional transaction data. The transaction record further stores a status indication indicating the status of the transaction. The transaction has four states:
1. Pending, indicating that the instruction to pay the receiver has been received by the receiving agent but payment has not yet been made to the receiver;
2. Remitted, indicating that the receiver has been paid;
3. Settled, indicating that the sending agent has been paid;
4. Failed/cancelled, indicating that the transaction has failed or has been blocked.

The transaction record can further store a password that a receiver must give to a receiving agent before they are paid.

The database 10 further stores exchange rate and commission data 18. Exchange rate data must be updated regularly to reflect current exchange rates. The commission data can comprise commission rates to be used for transactions. The exchange rate and commission data is referred to in the formation of a transaction record.

It will thus be clear that the data stored in the database 10 contains a wealth of information on transactions implemented by agents which can be accessed and viewed as reports by administrators, agents, MLROs or credit controllers.

Figure 3:
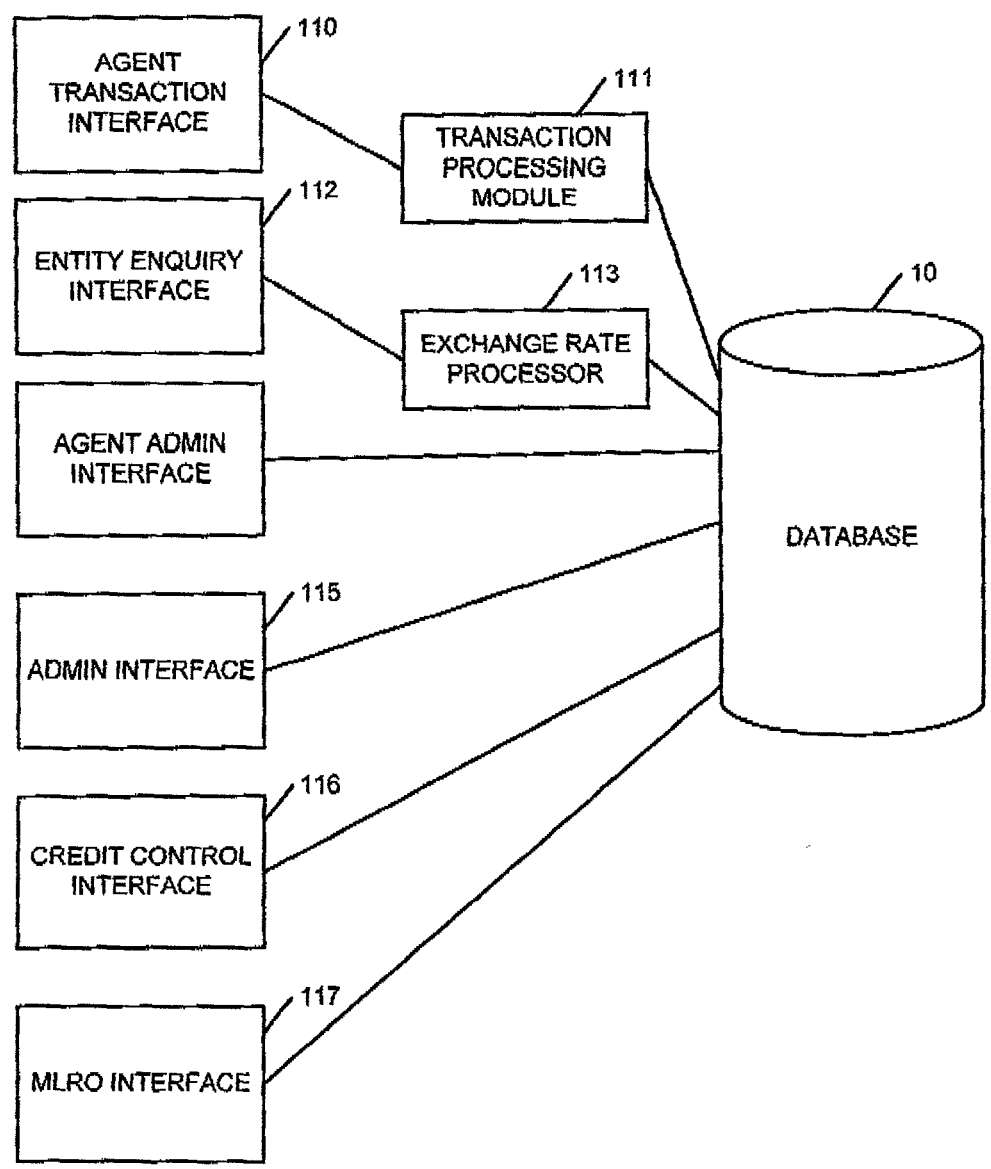
FIG. 3 is a schematic diagram illustrating the different interfaces provided to the database in an embodiment of the present invention.

Thus entities within the money transfer system comprise agents which can be organized hierarchically as parent and daughter agents or master and sub-agents, administrators, which can be provided with administrative access at different levels, credit controller, and MLRO. Each entity requires access to the database 10 with different levels of access. FIG. 3 illustrates the interfaces provided to the database 10 by the generation of appropriate web pages by the web server 6 using the Java code 9. An agent transaction interface 110 is provided for interfacing to a transaction processing module 111 comprising code implemented within the web server 6. An entity enquiry interface 112 is provided to allow an agent to perform enquiry functions via an exchange rate processor 113 implemented by the web server 6. This enables an agent to return information on rates of exchange, countries, cities and locations where money can be sent by an entity, the suggested nearest sending agent location to the location of the desired receiver, the total charge for making a transaction, the nett amount receivable in a particular country in a particular currency, the total amount to be paid, and the ability to check the status of transactions performed by an entity.

An agent is also provided with an agent administration interface 114 to allow an agent to access the database 10 in order to look at their account information and transactions performed by them, i.e. sending and receiving transactions. The agent administration interface allows an agent to access the following information:
To access the agent profile;
See all transactions performed by or on behalf of the agent;
To see the total sales made and commissions earned for a period of time;
To view the outstanding amount due to be paid to the money transfer organization.

The agent can type a record of the cash paid into the bank in lieu of the payments made. The agent can also view the status of transactions he is responsible for.

An administration interface 115 can be provided to database 10 to provide access to administrators at different levels. For example, a master administrator could have access to all data in the database. Local administrators, on the other hand, can have access only to certain parts of the database related to a number of agents, or to a geographic region. An administrator can view information dependent upon their level of access. An administrator can not only access data but can also make changes to, for example, currency exchange rates, commission rates and other data. The administrator can obtain reports for agents for which the administrator is responsible, showing transactions for periods of time, or transactions that meet certain criteria.

Credit controllers are provided with a credit control interface 116 to enable them to perform credit control. Money laundering regulation officers (MLROs) are provided with a MLRO interface 117 to enable them to perform their regulatory function.

Figure 4:
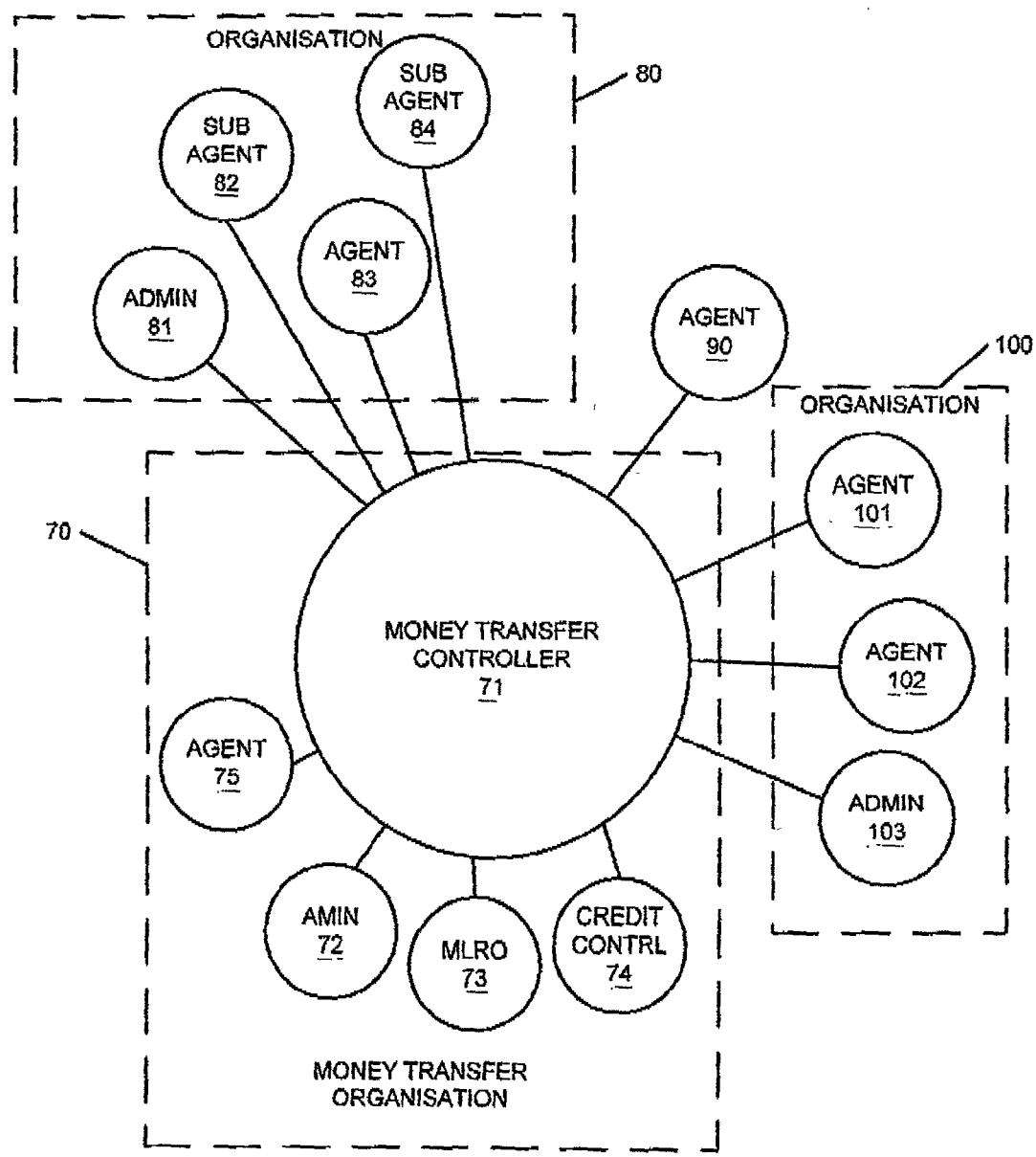
FIG. 4 is a schematic diagram illustrating how agents can be controlled and organized in a money transfer system in accordance with an embodiment of the present invention.

FIG. 4 illustrates how the various entities in the money transfer system can be organized. A money transfer organization 70 controls the money transfer controller 71. The money transfer organization 70 is also provided with an administrator 72, a credit controller 74 and a money laundering regulation officer 73. This enables the money transfer organization to provide for central control of the money transfer service. The money transfer organization 70 can also include their own agents 75 which are under their direct control. Outside the money transfer organization 70 agents can operate independently such as agent 90. Such an agent could, for example, be operated by the owner of a newsagent. This enables people to go to the newsagent and send money to recipients overseas. Because the system is a web-based system, the owner of the newsagent acting as an agent simply requires access to the Internet in order to provide the service. They will also need to enter into a contractual relationship with regard to setting up an account with the money transfer organization 70.

In FIG. 4 organization 100 such as a company comprises two separate agents 101 and 102. The organization 100 also has an administrator 103 to provide an administrative function for the agents 101 and 102. Thus the money transfer organization 70 provides the organization with two agent interfaces and an administrative interface at a level required for the organization 100.

Organization 80 which can comprise for example a company, has an agent 83 and two sub-agents 82 and 84 which are sub-agents of agent 83. The main agent 83 of the organization has thus registered sub-agents 82 and 84 as sub-agents of agent 83 with the money transfer controller 71. This process will be described in more detail hereinafter. The organization 80 also has an administrator 81 to provide administrative control over the agent 83 and sub-agents 82 and 84. Thus the money transfer organization 70 has provided the organization 80 with interfaces to the money transfer controller 71 to enable three agents to access the money transfer controller 71, two of them being as sub-agents of the main agent 83, and an administrative interface.

Figure 5:
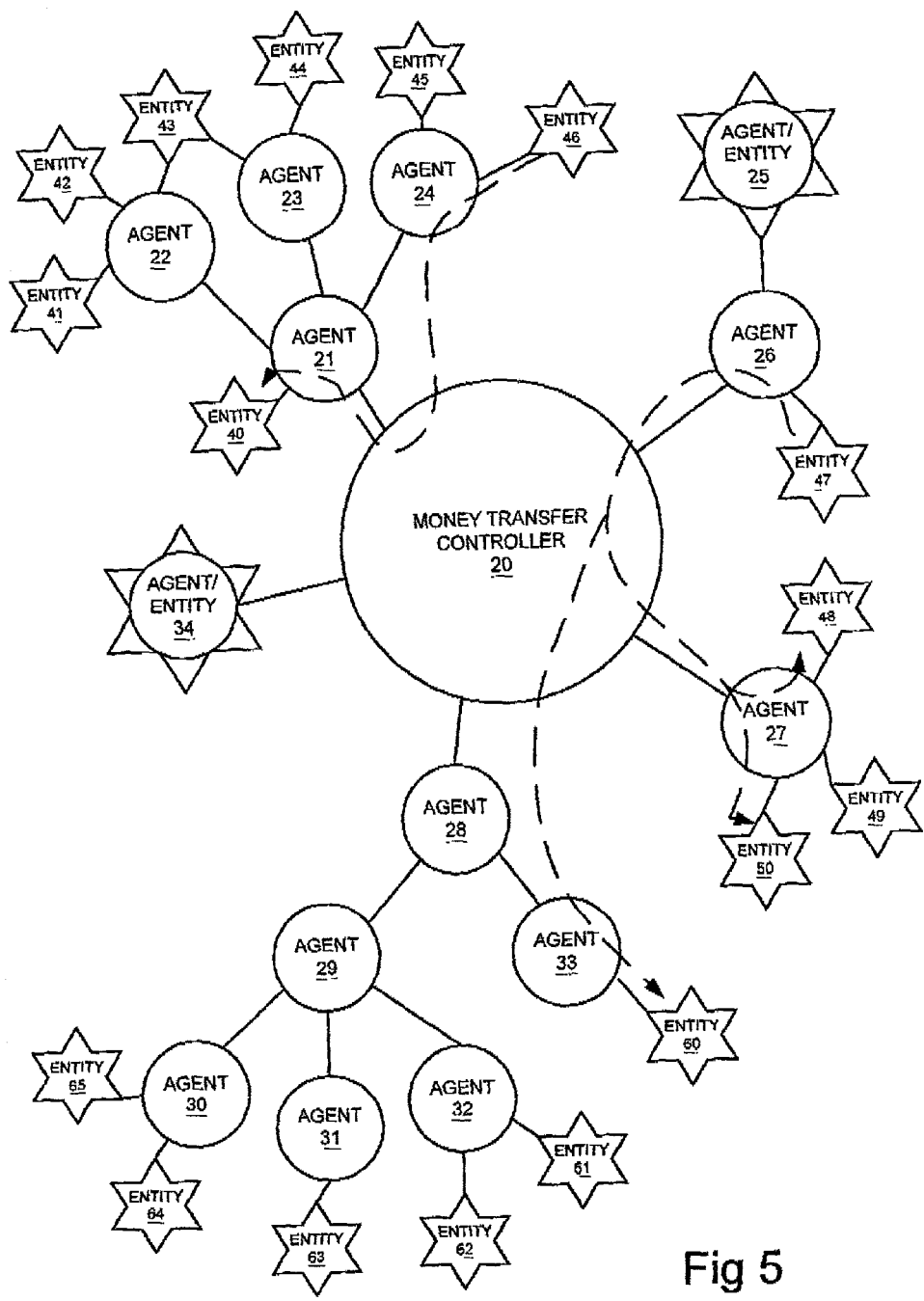
FIG. 5 is an organizational diagram illustrating the organization of agents hierarchically in a money transfer system in accordance with an embodiment of the present invention.

FIG. 5 is an organizational diagram illustrating the hierarchical organization of agents in relation to the money transfer controller and entities. The relationships illustrated by the solid lines in FIG. 5 are the financial responsibility relationships. For example, each agent or parent agent 21, 26, 27, 28 and 34 have a contractual relationship with the money transfer controller 20 and credit is arranged to enable these agents to transact. The remaining agents 22, 23, 24, 25, 29, 30, 31, 32 and 33 are all daughter or sub-agents that have been set up as sub-agents of the parent agents 21, 26 and 28. It is these parent agents 21, 26 and 28 that bear the financial responsibility of the sub-agents that they have registered. The sub-agents 22, 23, 24, 25, 29, 30, 31, 32 and 33 can perform transactions with any other agents. The transactions are, however, mapped to the accounts for the master or parent agents, particularly for credit checking purposes. Agents 21, 26 and 28 have limited credit which requires them to ensure that transactions are paid for by settling with receiving agents, and that their sub-agents settle transactions with receiving agents.

It can be seen in FIG. 5 that sub-agents can be registered as master agents for sub-agents and thus a hierarchy of agents can be registered with the money transfer controller 20. Each agent can implement the money transfers for separate entities, e.g. persons or companies, or the agent might be operated by an organization such as a company and therefore the agent becomes an agent/entity such as agent/entities 25 and 34.

The dashed lines in FIG. 5 illustrate money transfers between entities. Entity 46 is a sending entity using agent 24 as a sending agent. Sending agent 24, although responsible to parent agent 21 financially, can connect to the money transfer controller 20 using the web interface. The money transfer controller 20 will identify that the receiving agent is agent 21 and thus information will be transferred to agent 21 so that agent 21 can complete the transfer of the money to the receiving entity 40. It can be seen that this transfer comprises a transfer involving sub-agent 24 to parent agent 21. This is thus a transaction which could be implemented as a local transaction on a spoke in a hub and spoke transaction model as will be described in more detail with reference to the embodiment of FIG. 8.

The other transaction illustrated in FIG. 5 by the dashed line is a transaction from a sending entity 47 to multiple receiving entities 48, 50 and 60. The sending entity 47 uses the sending agent 26 to compile a single transaction for which the sending entity makes a single payment represented as a transaction from a single sending entity to multiple receiving entities. The transaction data will also indicate that two receiving agents 27 and 33 are involved in completion of the transfer to the three receiving entities 48, 50 and 60. The money transfer controller 20 thus receives the transaction data from the sending agent 26, stores it as a transaction and instructs the receiving agents 27 and 28 to make payment to their respective receiving entities 48, 50 and 60. It can thus be seen that for this transaction it is possible for a sending entity to make a single transaction to multiple receiving entities, thus simplifying the transaction process for the sending entity.

Figure 6:
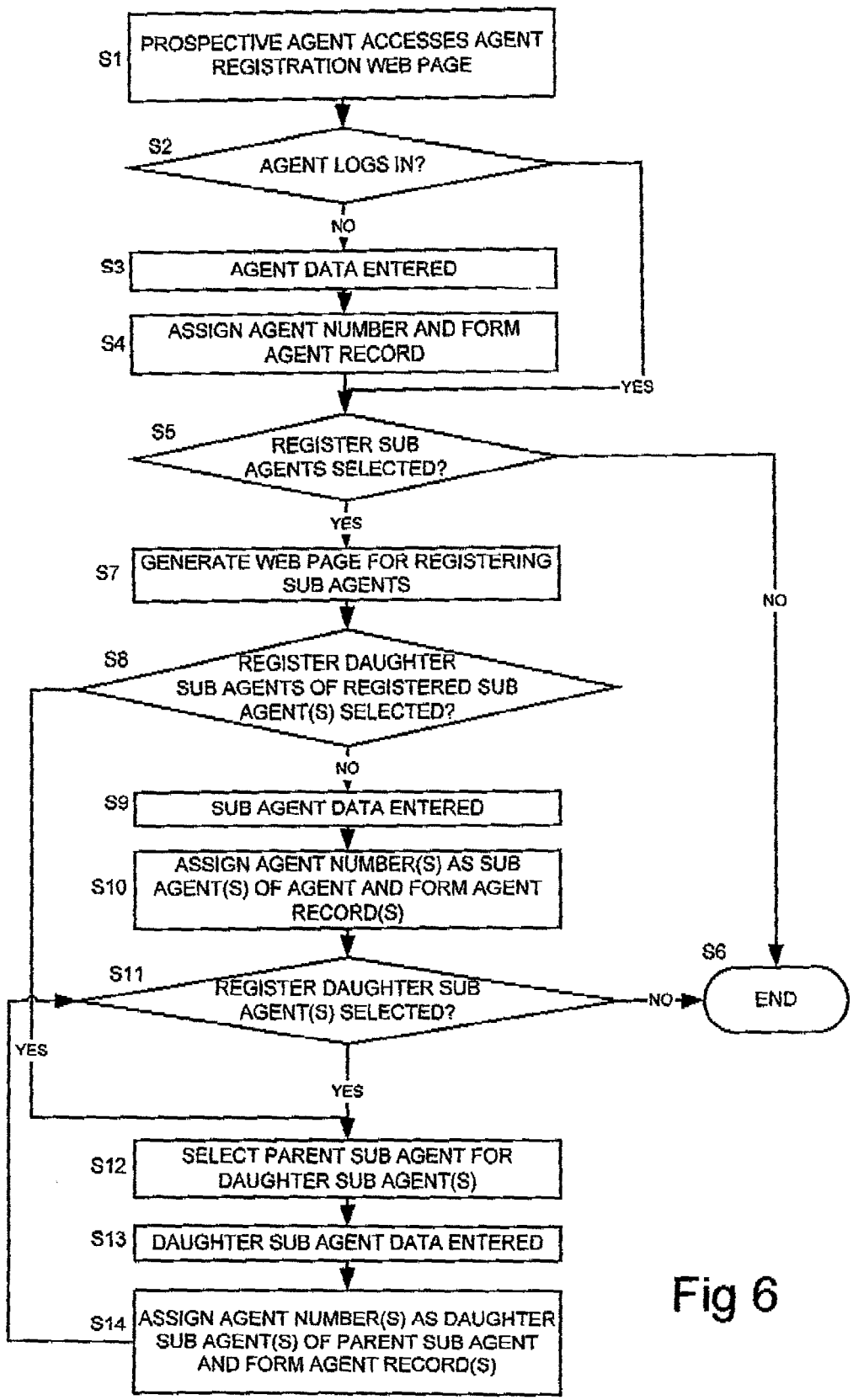
FIG. 6 is a flow diagram illustrating the method of registering agents in accordance with an embodiment of the present invention.

The process of registering agents for the money transfer service will now be described with reference to the flow diagram of FIG. 6. Any prospective agent for the service must first access the agent registration web page (step 81). If an agent has already registered, it is possible for the agent to log in (step S2) to enable them to register sub-agents (step S5).

If an agent does not log in (because they are not registered) they enter agent data (step S3) to enable an agent record to be formed in the database 10 (step S4). When an agent registers, they will need to either obtain secured credit or make a deposit to use the service. The level of credit or the level of their deposit will determine the credit available to them for transactions.

Once an agent is registered, it is possible for the agent to select to register sub-agents for which they will be financially responsible (step 85). If they do not select to register sub-agents, the registration process is terminated (step S6). If the agent selects to register sub-agents (step S5), a web page is generated by the web server 6 for registering sub-agent (step S7). An agent can then select to register daughter sub-agents of a registered sub-agent (step S8). If the agent does not select at this point to register sub-agents of a registered sub-agent, but instead wishes to register a sub-agent, the sub-agent data is entered (step S9) and an agent record is created for the sub-agent as a sub-agent of the agent (step S10). The agent can then select to register daughter sub-agents (step S11). If they do not select and register daughter sub-agents, the registration process is terminated (step S6). If the agent selects to register daughter sub-agents (step S8 or step S11) the parent sub-agent for the daughter sub-agent is selected (step S12) and daughter sub-agent data is entered (step S13). An agent record is then formed for the daughter sub-agent as a daughter sub-agent of the parent sub-agent (step S14). This process can be repeated for further daughter sub-agents (step S11).

In this way an agent operating as a master or parent agent can register a hierarchy of sub-agents for which the master or parent agent takes financial responsibility. Such an agent is agent 28 illustrated in FIG. 5 which has two sub-agents 29 and 33. Sub-agent 29 has daughter sub-agents 30, 31 and 32. All of these agents 29, 30, 31, 32 and 33 fall under the financial responsibility of the parent agent 28.

Figure 7A:
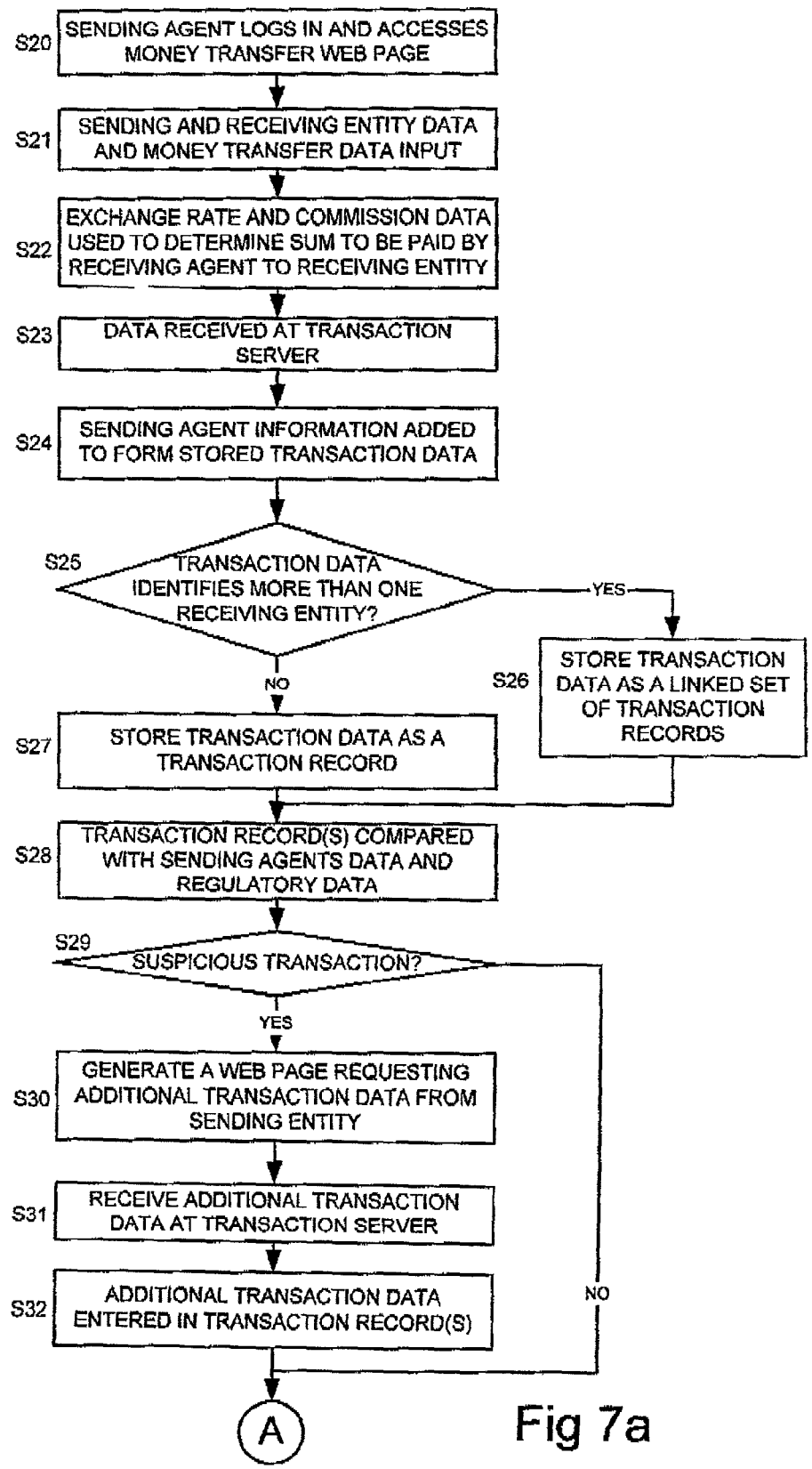
FIGS. 7a and 7b are a flow diagram illustrating the money transfer process in accordance with an embodiment of the present invention.
Figure 7B:
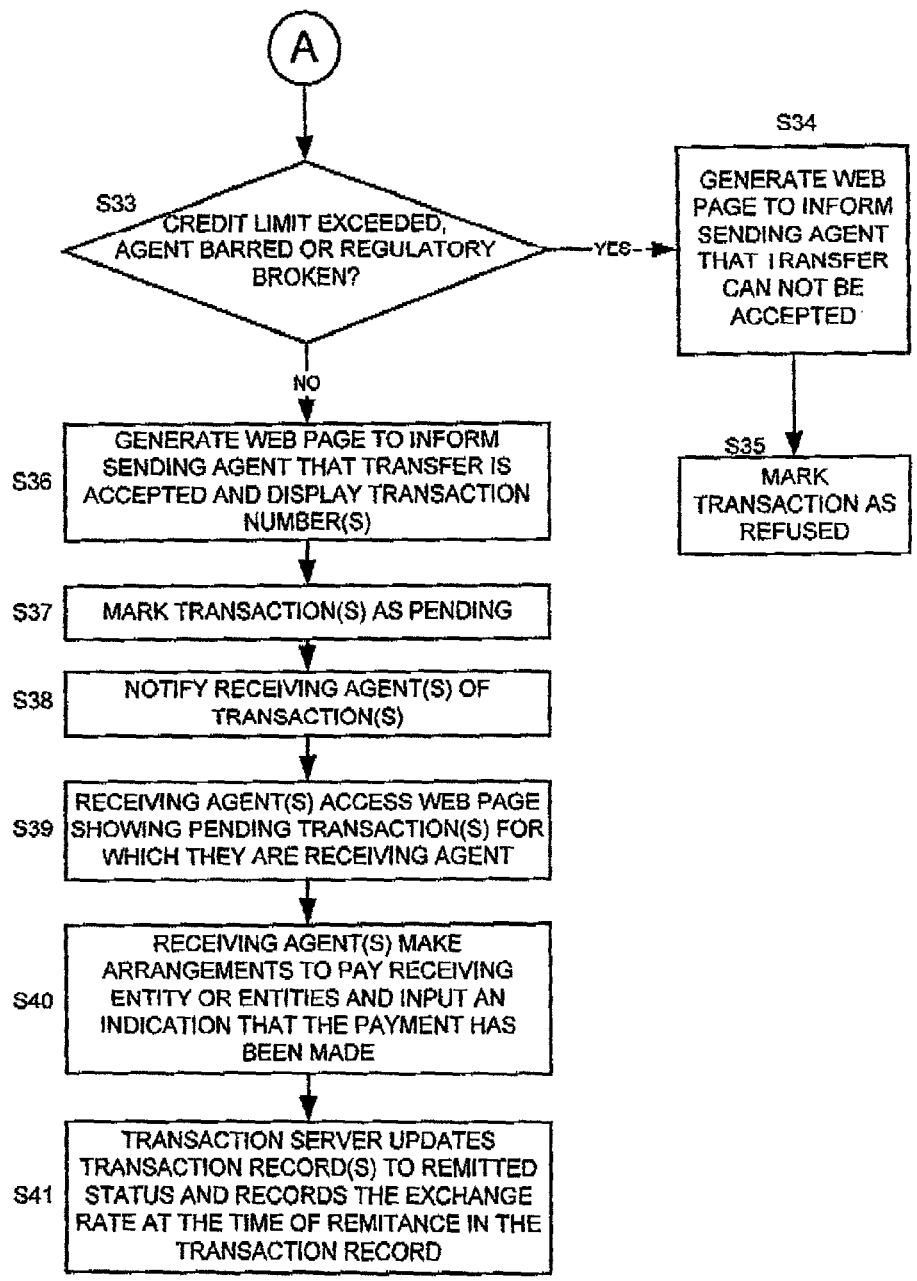

The process of transferring money from a sending entity to one or more receiving entities will now be described with reference to the flow diagram of FIGS. 7a and 7b.

When a sending entity instructs an agent to transfer money to one or more receiving agents, the sending agent logs in to the money transfer system and accesses the money transfer web page provided by the web server 6 (step S20). The sending agent takes the following information from the customer:

Customer number (if not a new customer)
Sender's title
Sender's first name
Sender's last name
Sender's date of birth or age
Sender's fill address
Sender's postcode
Sender's phone number
Sender's e-mail
Mode of payment, e.g. cash, draft or bank account
Bank, bank account number, branch, sort code
Where the money is to be sent
The amount to be sent
Paying-in currency (by default this is the local currency of the sending agent)
Paying-out currency
Password he wants the receiver to give to obtain the money
Reasons for sending (required for money laundering regulations), i.e. personal, family maintenance or foreign tourist
Is this the sender's money (yes or no)
Recipient's title
Recipient's date of birth or age
Receipt's first name
Recipient's last name
Recipient's address
Recipient's phone number
Total amount to be paid to the sending customer
Pay out method, e.g. cash, cheque or credit card Thus, the sending and receiving entity data and money transfer data is input (step S21). The exchange rate and commission data is used to determine the sum to be paid by the receiving agent to the receiving entity (step S22).

During the determination of the exchange rate and the finalization of the transaction by the sending agent, a receipt is issued to the sender. A sender can also see the status of all previous transactions carried out on his behalf.

The data is sent to and received at the transaction server (step S23). The transaction server adds the sending agent information obtained by virtue of identifying the agent during the log-on sequence (step S20) is added to the received data for the stored transaction data (step S24). The transaction server then determines whether the transaction data identifies more than one receiving entity (step S25). If so, the transaction data is stored as a linked set of transaction records where the transaction records are associated or linked by the sending entity and/or agent and are indexed by the receiving agents and/or entities. If the transaction data identifies only one receiving entity (step S25) the transaction data is stored as a transaction record (step S27). The transaction record or records are then compared to the sending agents data and the regulatory data (step S28). If the comparison of the transaction record or records of the regulatory data identifies that the transaction is a suspicious or irregular transaction (step S29), a web page requesting additional transaction data from the sending entity is generated (step S30). Thus the sending entity must provide further data such as passport details, driving licence or other acceptable identification. The comparison (step S28) enables a possibly valid but suspicious or irregular transaction to be processed with necessary additional data to aid the detection of money laundering. The additional transaction data is received at the transaction server (step S31) as a result of the sending agent filling in the forms on the web page, and the additional transaction data is entered in the transaction record or records (step S32).

Once the additional transaction data has been entered in the transaction records, or if the transaction is not a suspicious or irregular transaction, the transaction server then determines whether the transaction causes the credit limit for the sending agent to be exceeded, or whether the agent has been barred from using the service, or whether a money laundering compliance regulation would be broken by the transaction. If so, a web page is generated to inform the sending agent that the money transfer cannot be accepted (step S34), the transaction is then marked as refused in the transaction records (step S35). Thus in this way the transaction server can monitor and control transactions and prevent transactions which would either expose the receiving agent to an unacceable credit risk (because the credit limit of the sending agent has been exceeded or the agent has been barred) or breach money laundering compliance regulations applicable to the transaction.

If it is determined that the credit limit has not been exceeded for the sending agent, the sending agent is not barred, and that no regulation has been broken (step S33) a web page is generated to inform the sending agent that the transfer is accepted and the transaction number or numbers are displayed (step S36). The transaction server marks the transaction or transactions as pending (step S37) and the receiving agent or agents for the transaction or transactions are notified (step S38). The receiving agent or agents then accesses the web page showing pending transactions for which they are the receiving agent (step S39). The receiving agent or agents then make arrangements to pay the receiving entity or entities and input an indication that the payment or payments have been made (step S40). In order for the receiving agent to pay the receiving entity, the receiving entity must confirm their name, address, telephone number, the amount they expect to receive, from whom he expected to receive the funds, the country from which the funds are expected to come from, a password (if applicable), a form of identification, and a selection of the method of payout.

The transaction server then updates the transaction record or records to remitted status and records the exchange rate at the time of remittance in the transaction record (step S41). The recording of the exchange rate of the time remittance in the transaction record enables the exchange rate difference for a transaction record, i.e. the spread to be determined. Because the money transfer organization accept payment from the sending entity based on the exchange rate at the time of payment by the sending entity and then make payment to the receiving entity based on the exchange rate at the time of payment, there is a potential exchange rate difference. This is borne by the money transfer organization. This exchange rate difference may result in a profit or a loss. Careful selection of exchange rates used for calculation of the payment to be made by the sending entity need to be used to avoid exchange rate losses. At the end of each day, the sending agent will deposit all money he has received from all customers minus his commission in a bank specified by the money transfer organization. This allows the money transfer organization to credit accounts accordingly, i.e. to transfer funds to receiving agents who have paid money out to receiving entities. Records of the payment of the cash made to the money transfer organization can be entered by the sending entity using the administration interface 114.

Once transactions have been completed using the administration interface, agents can view their account data of previous transactions. This enables agents to affect a netting off against any other agents at any time using the current exchange rates.

Figure 8:
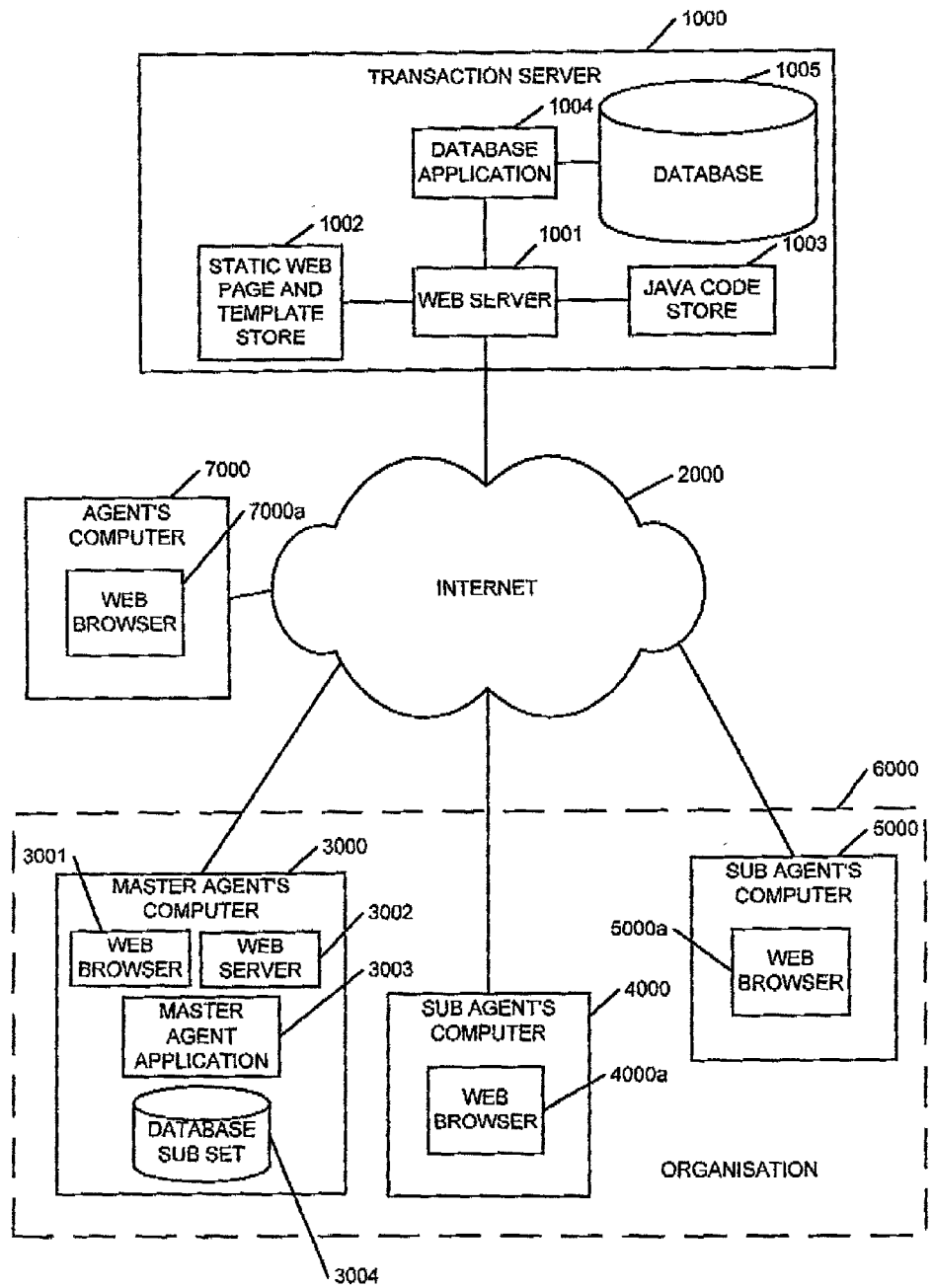
FIG. 8 is a schematic diagram of a system for implementing a hub and spoke money transfer service in accordance with an embodiment of the present invention.

FIG. 8 is a schematic diagram of a money transfer system in accordance with another embodiment of the present invention. The system operates as a hub and spoke money transfer system in which the transaction server 1000 acts as a hub and the master agent's computer 3000 acts as a spoke. In this embodiment of the present invention, a master agent operating the master agent's computer 3000 has registered two sub-agents operating sub-agents' computers 4000 and 5000, each implementing respective web browsers 4000*a* and 5000*a*. The agents are all part of an organization 6000. The master agent is liable for its sub-agents as described hereinabove.

In this embodiment of the present invention, when a master agent registers as a master agent, the master agent's computer 3000 is configured as a spoke in the hub and spoke money transfer system. The master agent's computer receives code for implementing a master agent application 3003 that a database subset 3004 which is a subset of database 1005 in the transaction server 1000 (i.e. the hub). The master agent's computer 3000 also implements a web browser 3001 and web server 3002.

The transaction server 1000 acting as hub money transfer system comprises a web server 1001 implementing Java code stored in the Java code store 1003 and static web page and templates stored in a static web page and templates store 1002. The database application 1004 acts as an interface between the web server 1001 and the database 1005. The operation of the transaction server 1000 is substantially the same as described hereinabove for the previous embodiment.

When a sub-agent is instructed to a receiving entity, if the receiving entity wishes to use a receiving agent having the agent's computer 7000, since this is not under the control of the master agent, the sub-agent must use the transaction server 1000 as the hub money transfer system as described hereinabove for the previous embodiment However, if money is to be transferred from a sending agent operating the sub-agent's computer 5000 to the agent operating as a receiving agent and operating a sub-agents computer 4000, the master agent's computer 3000 can be used as a spoke money transfer system. Since there is no responsibility outside the organization 6000 for the money transfer, the hub money transfer system need not be involved. There is simply a transfer of funds between agents for which the master agent has ultimate liability Thus, the web browser 5000*a* of the sub-agents computer 5000 can be used by the sending agent to access the web server 3002 at the master agent's computer 3000 The master agent application 3003 can then access data within the database subset 3004 in order to complete the transaction to the receiving agent using the sub-agents computer 4000. In this way the transaction is controlled by the master agent application 3003 and the database subset 3004 contains records of local transactions within the organization 6000.

In order to ensure that the hub money transfer system implemented by the transaction server 1000 contains an up-to-date global database 1005, periodically, the database application 1004 implements a procedure to synchronize the database subset 3004 with the database 1005.

It can thus be seen that this second embodiment of the present invention enables local transactions to be implemented using a spoke money transfer system implemented under the control of a master agent for transactions between sub-agents of the master agent.

Although the present invention has been described hereinabove with reference to specific embodiments, it will be apparent to the skilled person in the art that modifications lie within the spirit and scope of the present invention.

For example, although the currency conversion has been described hereinabove as a direct conversion from the sender's currency to the receiver's currency, the present invention encompasses the use of any number of intermediate currencies in the currency conversion process.

What is claimed is:

1. A computerized money transfer system implementing a money transfer service for transferring money from a sending entity to at least one receiving entity comprising:

a a plurality of agent terminals that is operated by agents of the money transfer service, said agent terminal being interconnected by a communications network:

a money transfer control system connected by the communications network to the plurality of agent terminals, wherein said money transfer control system solely controls and implements a money transfer transaction in the money transfer service, the money transfer control system including an agent account data store storing account data for each agent, and a transaction data store storing transaction data for transactions by agents implementing money transfers from a sending entity to at least one receiving entity, wherein the money transfer control system is positioned in a first currency location with first local money transfer regulations;

wherein at least one of said agent terminals, located in a second currency location with second local money transfer regulations and part of a first organization having a sending agent and a sending entity, (i) is responsive to data input by the sending agent instigating a money transfer requested by the sending entity to at least one receiving entity that is part of a second organization different from the first organization, and (ii) transmits the input data to the money transfer control system; wherein the input data identifies the sending and receiving entity or entities, the sending agent, and at least one receiving agent, who is part of the second organization, and transmits the money transferred thereto to the each receiving entity;

wherein the money transfer control system applies first local money transfer regulations and second local money transfer regulations to the money transfer request;

wherein the money transfer control system records the input data in said transaction data store as a transaction from a sending agent to at least one receiving agent for a sending entity and at least one receiving entity, with the sending agent terminal and the receiving agent terminal being in separate currency locations, and updates the agent account data in the agent account data store for the sending and receiving agents;

wherein the first organization and the second organization are unrelated, and a money transfer transaction occurs through and is solely controlled by the money transfer control system;

wherein the money transfer control system implements and carries out the money transfer transaction between the sending agent and the at least one receiving agent such that the sending agent communicates with the money transfer control system, and the at least one receiving agent communicates with the money transfer control system; and wherein neither the sending entity nor the sending agent is required to communicate directly with or send information directly to either one of the at least one receiving agent and the at least one receiving entity, in order to verify or complete the money transfer transaction.

2. A a computerized money transfer system according to claim 1, wherein the money transfer requested is from a sending currency to a receiving currency, said money transfer control system includes an exchange rate data store storing exchange rate data, said agents account data store stores account data for each agent in a local currency for the agent, and said money transfer control system is adapted to use the exchange rate data in said exchange rate data store to convert currency values for transactions to determine an amount in the receiving currency based on an amount in the sending currency, to store the amounts as part of the transaction stored in said transaction data store, and to update the agent account data in the agent account data store for the agents in the local currencies based on the exchange rate data.

3. The computerized money transfer system according to claim 1, wherein said money transfer control system is adapted to send a request for further information from the sending entity at the agent terminal operated by the sending agent if the transaction fits a predetermined criteria, receive the further information from the agent terminal, and to associate the further information with the transaction in the transaction data store.

4. The computerized money transfer system according to claim 1, wherein said receiving agent is in a third currency location and wherein said money transfer control system is adapted to monitor the transaction for compliance with regulations of the third currency location.

5. The computerized money transfer system according to claim 1, wherein said money transfer control system includes a money laundering regulation interface if module and a money laundering regulation record.

6. The computerized money transfer system according to claim 1, wherein said plurality of agent terminals can each act to send money and receive money.

7. The computerized money transfer system according to claim 1, wherein a group of said plurality of agent terminals in a single organization can send and receive money to each other without accessing the money transfer control system.

8. The computerized money transfer system according to claim 1, wherein the money transfer control system applies money laundering regulations for transactions between terminals in different countries.

9. The computerized money transfer system according to claim 1, wherein said money transfer control system is adapted to provide accounting for both the first organization and the second organization.

10. The computerized money transfer system according to claim 1, wherein said money transfer control system is the only link between the sending entity and the receiving entity.

11. A a computerized money transfer system according to claim 3, wherein said money transfer control system includes a first transaction controller to control the transaction based on a comparison of a returned further information and predetermined criteria.

12. A a computerized money transfer system according to claim 11, wherein said first transaction control system is adapted to determine if the received further information matches a predetermined criteria, and if so, to block the money transfer and to transmit a message to the agent terminal operated by the sending agent to inform the sending agent that the money transfer has not occurred.

13. A computerized money transfer system according to claim 1, wherein said money transfer control system is adapted to receive input data from an agent terminal identifying a sending entity of a first discrete organization and a plurality of receiving entities of at least one second discrete organization, and to store transaction data in the transaction data store as a single sending transaction indexed for the sending entity and as a plurality of receiving transactions indexed for each receiving entity.

14. A computerized money transfer system according to claim 1, wherein said money transfer control system is adapted to receive input data from an agent terminal identifying a sending entity, a sending agent, a plurality of receiving entities and a plurality of receiving agents, and to store transaction data in the transaction data store as a single sending transaction indexed for the sending agent and as a plurality of receiving transactions indexed for each receiving agent.

15. A computerized money transfer system according to claim 1, wherein said money transfer control system is implemented as a web service over an Internet Protocol network, and each said agent terminals implements a web browser application to communicate with said money transfer control system.

16. A computerized money transfer system according to claim 1, wherein said money transfer control system includes an administration interface to allow agents to access respective agent account data in said agent account data store and transaction data in said transaction data store.

17. A computerized money transfer system according to claim 1, wherein said money transfer control system includes account netting off means for allowing agents to determine a net off of their accounts in the accounts data store against any other agent.

18. A computerized money transfer system according to claim 1, wherein at least one agent terminal includes a sending entity recognition device for automatically inputting data identifying a sending entity.

19. A computerized money transfer system implementing a money transfer service for transferring money from a sending entity to at least one receiving entity, the system comprising:
a plurality of agent terminals that are operated by agents of the money transfer service, said agent terminals being interconnected by a communications network,
a money transfer control system connected to the plurality of agent terminals by the communications network, said money transfer control system solely controls and implements a money transfer transaction in the money transfer service, the money transfer system being in a first country with a first currency and first money transfer regulations, the money transfer control system including an agent account data store storing account data for each agent, and a transaction data store storing transaction data for transactions by agents implementing money transfers from a sending entity to at least one receiving entity;
wherein at least one of said agent terminals, located in a second country with a second currency, subject to second money transfer regulations and part of a first organization, is responsive to data input by a sending agent instigating a money transfer requested by a sending entity to at least one receiving entity, and transmits the input data to the money transfer control system;
wherein the input data identifies the sending and receiving entity or entities, the sending agent, and at least one receiving agent in a third country with a third currency, subject to a third money transfer regulations and part of a second organization different than the first organization that is to remit the money transferred thereto to the each receiving entity;
wherein the money transfer control system records the input data in said transaction data store as a transaction from a sending agent to at least one receiving agent for a sending entity and at least one receiving entity, and updates the agent account data in the agent account data store for the sending and receiving agents;
wherein the money transfer control system applies the first, second and third money transfer regulations to the money transfer request;
wherein said money transfer control system includes an interface that allows agents operating agent terminals to be registered as a master agent and other agents to be registered as sub agents, and links the account data in the account data store for the sub agents to the master agent;
wherein the first organization and the second organization are unaffiliated and unrelated, and a money transfer transaction occurs through and is solely controlled by the money transfer control system;
wherein the money transfer control system implements and carries out the money transfer transaction between the sending agent and the at least one receiving agent such that the sending agent communicates with the money transfer control system, and the at least one receiving agent communicates with the money transfer control system; and
wherein neither the sending entity nor the sending agent is required to communicate directly with or send information directly to either one of the at least one receiving agent and the at least one receiving entity, in order to verify or complete the money transfer transaction.

20. A computerized money transfer system according to claim 19, wherein at least one agent terminal operated by an agent registered as a master agent includes a domain money transfer control system to control the implementation of the money transfer service between agents in a set of agent terminals operated by agents registered as sub agents of the master agent, wherein the master agent connects the sub agents to the money transfer control system; and
said at least one agent terminal including a domain agent account data store storing account data for the set of agents, and a domain transaction data store storing transaction data for transactions between agents in the set of agents.

21. A method of controlling the implementation of a money transfer service for transferring money from a sending entity to at least one receiving entity, by a computerized central money transfer control system connected to a plurality of agent terminals by a communications network, wherein the computerized central money transfer control system solely controls the money transfer, said agent terminals are interconnected by the communications network and are operated by agents to instigate a money transfer requested by a sending entity to at least one receiving entity, the method comprising:
storing account data for each agent in an agent account data store; receiving, at the computerized central money transfer control system, data from a sending agent terminal in a first country with first money transfer regulations, wherein the data identifies the sending and receiving entities, the sending agent, and at least one receiving agent that is in a second country with second money transfer regulations and that is to remit the money transferred thereto to the each receiving entity, wherein a computerized central money transfer organization provides the money transfer route between the sending agent and the receiving agent, which are part of unrelated organizations;

recording at the computerized central money transfer control system, the input data in a transaction data store as a transaction from a sending agent to at least one receiving agent for a sending entity and at least one receiving entity;

updating the agent account data in the agent account data store for the sending and receiving agents based on the transactions;

monitoring transactions, at the central money transfer control system, for compliance with the first money transfer regulations and with the second money transfer regulations at the computerized money transfer control system; wherein the computerized central money transfer control system applies said first money transfer regulations and said second money transfer regulations to the transactions; and carrying out the money transfer transaction between the sending agent and the at least one receiving agent by the computerized central money transfer control system, wherein neither the sending entity nor sending agent is required to communicate directly with or send information directly to either one of the at least one receiving entity and at least one receiving agent in order to verify or complete the money transfer transaction.

22. A method according to claim 21, wherein the money transfer requested is from a sending currency to a receiving currency, said agents account data store stores account data for each agent in a local currency for the agent, and the method includes using the exchange rate data in an exchange rate data store at the computerized money transfer control system to convert currency values for transactions to determine an amount in the receiving currency based on an amount in the sending currency, storing the amounts as part of the transaction stored in said transaction data store, and updating the agent account data in the agent account data store for the agents in the local currencies based on the exchange rate data.

23. The method according to claim 22, comprising sending a request for further information from the sending entity to the agent terminal operated by the sending agent if the transaction fits a predetermined criteria, receiving the further information from the agent terminal, and associating the further information with the transaction in the transaction data store.

24. A method according to claim 21, wherein the computerized central money transfer control system controls the transaction based on a comparison of a returned further information and predetermined criteria.

25. A method according to claim 24, wherein the transaction is controlled by the computerized central money transfer control system determining if the received further information matches a predetermined criteria, and if so, blocking the money transfer and transmitting a message to the agent terminal operated by the sending agent to inform the sending agent that the money transfer has been blocked.

26. A method according to claim 21, including the computerized central money transfer control system controlling the transaction by comparing the transaction to predetermined criteria.

27. A method according to claim 26, wherein the transaction is controlled by the computerized central money transfer control system comparing the transaction to money laundering compliance regulatory data representing money laundering compliance regulations, and blocking the transaction if the comparison determines that the transaction contravenes the money laundering compliance regulations.

28. A method according to claim 21, including the computerized central money transfer control system controlling the transaction by reference to the transaction and account data in said account data store for the sending agent.

29. A method according to claim 21, including providing an interface to allow agents operating agent terminals to be registered as a master agent and other agents to be registered as sub agents, and linking the account data in the account data store for the sub agents to the master agent.

30. A method according to claim 21, wherein said received input data from an agent terminal identifies a sending entity and a plurality of receiving entities, and the transaction data is stored in the transaction data store as a single sending transaction indexed for the sending entity and as a plurality of receiving transactions indexed for each receiving entity.

31. A method according to claim 21, wherein said received input data from an agent terminal identifies a sending entity, a sending agent, a plurality of receiving entities and a plurality of receiving agents, and the transaction data is stored in the transaction data store as a single sending transaction indexed for the sending agent and as a plurality of receiving transactions indexed for each receiving agent.

32. A method according to claim 21, including providing as an interface a web service over an Internet Protocol network, wherein each of said agent terminals implements a web browser application to communicate with said money transfer control system.

33. A method according to claim 21, including providing an administration is interface to allow agents to access respective agent account data in said agent account data store and transaction data in said transaction data store.

34. A method according to claim 21, including providing an in interface to allow agents to determine a net off of their accounts in the accounts data store against any other agent.

35. A money transfer system comprising:

a computerized money transfer control system that is connected to a plurality of agent terminals over a communications network, wherein the computerized money transfer control system solely controls and implements a money transfer transaction in a money transfer service that transfers money from a sending entity of a first organization subject to first money laundering regulations to at least one receiving entity of a second organization subject to second money laundering regulations, said agent terminals being interconnected by the communications network and that is operated by agents to instigate a money transfer requested by a sending entity to at least one receiving entity, the agent terminals of the sending entity and the receiving entity are part of different unrelated organizations for a money transfer, and a money transfer occurs through and is solely controlled by the money transfer system, wherein the computerized money transfer control system implements and carries out the money transfer transaction between a sending agent and at least one receiving agent terminal such that the sending agent communicates with the computerized money transfer control system, and the at least one receiving agent communicates with the computerized money transfer control system, and wherein neither the sending entity nor the sending agent is required to communicate directly with or send information directly to either one of the at least one receiving agent and the at least one receiving entity, in order to verify or complete the money transfer transaction, the computerized money transfer control system including:

an agent account data store storing account data for each agent; a transaction data store storing transaction data for transactions by agents implementing money transfers from a sending entity to at least one receiving entity;

a money laundering regulator that applies both first money laundering regulations and the second money laundering regulations to the money transfer request;

a receiver that receives input data from said agent terminal, wherein the input data identifies the sending and receiving entities, the sending agent, and the at least one receiving agent that is to remit the money transferred thereto to the each receiving entity;

a recorder for recording the input data in said transaction data store as a transaction from the sending agent to the at least one receiving agent for a sending entity and the at least one receiving entity;

an account data updater for updating the agent account data in the agent account data store for the sending and receiving agents based on the transaction; and a master agent terminal, operated by an agent registered as a master agent, implements a domain money transfer control system to control the implementation of the money transfer service between agents in a set of agent terminals operated by agents registered as sub agents of the master agent, stores account data for the set of agents, and stores transaction data for transactions between agents in the set of agents.

36. A computerized money transfer system implementing a money transfer service for transferring money from a sender to a plurality of receivers, comprising:

a plurality of terminals interconnected by a communications network;

a computerized money transfer control system, connected to the communications network wherein the computerized money transfer control system solely controls and implements a money transfer transaction in the money transfer service, the money transfer control system including a transaction data store storing transaction data for transactions implementing money transfers from a sender to the receivers;

wherein at least one of said terminals, which is in a first transfer regulation jurisdiction and is part of a first organization, is responsive to data that is entered to instigate a money transfer from a sender to at least one receiver that is in at least one second transfer regulation jurisdiction, and transmits the input data to the money transfer control system;

wherein the input data identifies the sender and receivers;

wherein the computerized money transfer control system records the input data in said transaction data store as a transaction from a sender to the plurality of receivers, apportions the transaction to each said receiver, sends data identifying the apportionment for respective receivers to at least one of the other terminals that is a part of a second organization that is unrelated to the first organization, to enable the completion of the money transfer to the respective receivers;

wherein the computerized money transfer control system applies a first money transfer regulation from the first transfer regulation jurisdiction and a second money transfer regulations from the second transfer regulation jurisdiction to the transaction;

wherein the computerized money transfer control system carries out the money transfer transaction between the sender and the at least one receiver that is in at least one second transfer regulation jurisdiction such that the sender communicates with the computerized money transfer control system, and the at least one receiver that is in at least one second transfer regulation jurisdiction communicates with the computerized money transfer control system; and wherein the sender is not required to communicate directly with or send information directly to the at least one receiver that is in at least one second transfer regulation jurisdiction, in order to verify or complete the money transfer transaction.

37. A computerized money transfer system according to claim 36, wherein said money transfer control system is adapted to store the input data as a single transaction indexed by the sender.

38. A computerized money transfer system according to claim 37, wherein at least one of said terminals is adapted to receive the input data as data representing a single transaction, and said money transfer control system is adapted to store the input data as a plurality of associated transactions associated by the sender and indexed by the receiver.

39. A computerized money transfer system according to claim 36, wherein the senders comprise agents of the money transfer system acting on instruction from sending entities, or the senders comprise sending entities; and the receivers comprise agents of the computerized money transfer system empowered to remit the transferred money to the receiving entities, or the receivers comprise receiving entities.

40. A computerized money transfer system money transfer control system connecting to a plurality of terminals over a communications network, wherein said computerized money transfer control system solely controls the implementation of a money transfer service for transferring money from a sender to a plurality of receivers through a plurality of countries with distinct money transfer regulations, said terminals being interconnected by the communications network and that instigates a money transfer from a sender to a plurality of receivers, the system comprising:

a transaction data store storing transaction data for transactions implementing money transfers from a sender in a first country to at least one of the receivers in a second country;

a receiver that receives data from a terminal that is a part of a first organization to instigate a money transfer from a sender to a plurality of receivers, wherein the received data identifies the sender in the first country and the receiver in the second country; and a transaction processor that records the received data in said transaction data store as a transaction from a sender to the plurality of receivers, apportions the transaction to each said receiver, and sends data identifying the apportionment for respective receiver to at least one terminal that is a part of a second organization unrelated to the first organization to enable the completion of the money transfer to the respective receiver;

a money laundering regulation store storing money laundering regulations for each of the countries in which a sender, an intermediary, and a receiver are located; and a transaction controller that communicates with the money laundering regulation store and that controls transactions by comparing them to the plurality of money laundering compliance regulations of the first country and the second country and any intermediary country;

wherein the transaction processor implements and carries out the money transfer transaction between the sender and the at least one of the receivers in the second country such that the sender communicates with the money transfer control system, and the at least one of the receivers in the second country communicates with the money transfer control system; and wherein the sender is not required to communicate directly with or send information directly to the at least one of the receivers in the second country, in order to verify or complete the money transfer transaction.

41. A computerized money transfer control system according to claim 40, wherein said transaction controller is adapted to store the input data as a single transaction indexed by the sender.

42. A computerized money transfer control system according to claim 41, wherein said receiver is in the first organization and is adapted to receive the input data as data representing a single transaction, and said transaction controller is in the second organization and is adapted to store the input data as a plurality of associated transactions associated by the sender and indexed by the receiver.

43. A computerized money transfer control system according to claim 40, wherein the senders comprise agents of the money transfer system acting on instruction from sending entities, or the senders comprise sending entities, and wherein the senders are part of a first organization; and the receivers comprise agents of the money transfer system empowered to remit the transferred money to the receiving entities, or the receivers comprise receiving entities, and wherein the receivers are part of a second organization different from the first organization.

44. The computerized money transfer system of claim 40, wherein the transaction controller is adapted to block transactions in cases where the comparison determines that the transactions contravene at least one of the applicable money laundering compliance regulations, to request further information if a transaction violates the money laundering compliance regulations, and to re-compare the further information and the transaction to the money laundering compliance regulations.

45. A method of controlling the implementation of a money transfer service for transferring money from a sender to a plurality of receivers, including a computerized money transfer control system that solely controls and implements a money transfer transaction in the money transfer service, the computerized money transfer control system being connected to a plurality of terminals over a communications network, said terminals being interconnected by the communications network and that instigates a money transfer from a sender to a plurality of receivers, the method comprising:

receiving data from a terminal that is a part of a first organization to instigate a money transfer from a sender in the first organization with first regulations to a plurality of receivers in at least one second organization with second regulations that are different than the first regulations, wherein the received data identifies the sender and receiver;

recording the received data in a transaction data store as a transaction from a sender to the plurality of receivers;

apportioning the transaction to each said receiver;

sending data identifying the apportionment for respective receiver to at least one terminal that is part of a second organization that is unrelated to the first organization, to enable the completion of the money transfer to the respective receiver;

carrying out the money transfer transaction between the sender and the at least one receiver solely through the use of the computerized money transfer control system, wherein the sender is not required to communicate directly with or send information directly to either one of the at least one receiver in order to verify or complete the money transfer transaction; and monitoring transactions for compliance with both the first regulations and the second regulations, wherein monitoring includes intervening in the transaction as needed, updating the transaction as needed, and blocking the transaction as needed, sending a request for further information from the sending entity to the agent terminal operated by the sending agent if the transaction fits a predetermined criteria, receiving the further information from an agent terminal, and associating the further information with the transaction in the transaction data store.

46. A method according to claim 45, wherein the input data is stored as a single transaction indexed by the sender.

47. A method according to claim 46, wherein the input data is received as data representing a single transaction, and the input data is stored as a plurality of associate transactions associated by the sender and indexed by the receiver.

48. A method according to claim 45, wherein the senders comprise agents of the money transfer system acting on instruction from sending entities, or the senders comprise sending entities; and the receivers comprise agents of the money transfer system empowered to remit the transferred money to the receiving entities, or the receivers comprise receiving entities.

49. A method of controlling the implementation of a money transfer service for transferring money from a sending entity to at least one receiving entity, including a computerized money transfer control system that solely controls and implements a money transfer transaction in the money transfer service, the computerized money transfer control system being connected to a plurality of agent terminals over a communications network, said agent terminals being interconnected by the communications network and that is operated by agents to instigate a money transfer requested by a sending entity to at least one receiving entity, the method comprising:

storing account data for each agent in an agent account data store; receiving data from at least one of said agent terminals, wherein the data identifies the sending and receiving entities, the sending agent, and at least one receiving agent that is to remit the money transferred thereto to the each receiving entity, wherein the sending agent and the receiving agent are part of unrelated organizations;

recording the input data in a transaction data store as a transaction from a sending agent to at least one receiving agent for a sending entity and at least one receiving entity;

updating the agent account data in the agent account data store for the sending and receiving agents based on the transaction;

carrying out the money transfer transaction between the sending agent and the at least one receiving agent through the use of the money transfer control system, wherein neither the sending entity nor sending agent is required to communicate directly with or send information directly to either one of the at least one receiving entity and at least one receiving agent in order to verify or complete the money transfer transaction; and controlling the transaction by comparing the transaction to predetermined data stored in a money laundering record, which includes the regulations for each country that is part of the money transfer, if the comparison fails, then requesting further data regarding the transaction.

50. A method according to claim 49, wherein controlling the transaction includes the money transfer control system comparing the transaction to money laundering compliance regulatory data representing money laundering compliance regulations, and blocking the transaction if the comparison determines that the transaction contravenes the money laundering compliance regulations.

51. A method according to claim 49, including providing an interface to allow agents operating agent terminals to be registered as a master agent and other agents to be registered as sub agents, and linking the account data in the account data store for the sub agents to the master agent.

52. A method according to claim 49, including providing an administration interface to allow agents to access respective agent account data in said agent account data store and transaction data in said transaction data store.

53. A computerized money transfer system for implementing a money transfer service for transferring money between a sending entity and at least one receiving entity using different unrelated organizations, comprising:

a money transfer control system connected to a communications network, wherein the money transfer control system solely controls and
implements a money transfer transaction in the money transfer service between a plurality of agent terminals operable by agents of the money transfer service and being interconnected by the communications network, wherein the computerized money transfer control system implements and carries out the money transfer transaction between a sending agent and at least one receiving agent such that the sending agent communicates with the money transfer control system, and the at least one receiving agent communicates with the money transfer control system, and wherein neither the sending entity nor the sending agent is required to communicate directly with or send information directly to either one of the at least one receiving agent and the at least one receiving entity, in order to verify or complete the money transfer transaction, the money transfer control system including:

an agent account data store storing account data for each agent; and a transaction data store storing transaction data for transactions by agents implementing money transfers from sending entities to at least one receiving entity;

a money laundering regulation record that stores and inputs the money laundering regulations for each country in which an agent terminal is located and the money laundering regulations in a country where the money transfer control system is located; and a financial hierarchy data store storing data indicating whether an agent is under financial responsibility of another agent.

54. The computerized money transfer system of claim 53, wherein the financial hierarchy data store also stores data indicating which agents of a first organization are under the financial responsibility of which other agents of a second organization.

55. The computerized money transfer system of claim 53, wherein data for transactions by given agents is mapped to data for transactions for agents of which they are under financial responsibility.

56. The computerized money transfer system of claim 53, wherein the money transfer control system includes a compliance data store storing predetermined compliance data for transactions.

57. A a computerized money transfer system capable of implementing a money transfer service for transferring money between a sending entity and at least one receiving entity, comprising:

a plurality of agent terminals operable by agents of the money transfer service, said agent terminals interconnected by a communications network;

a first money transfer control system connected to the communications network;

wherein the first money transfer control system solely controls and implements a money transfer transaction in the money transfer service, the first money transfer control system including an agent account data store storing account data for each agent, and a transaction data store storing transaction data for transactions by agents implementing money transfers from sending entities to at least one receiving entity;

wherein the money transfer control system completes the money transfer transaction between a sending entity and the at least one receiving entity using a sending agent and at least one receiving agent, such that the sending agent and at least one receiving agent are a part of unrelated organizations, and the sending agent communicates with the money transfer control system, and the at least one receiving agent communicates with the money transfer control system;

wherein neither the sending entity nor the sending agent is required to communicate directly with or send information directly to the at least one receiving agent or the at least one receiving entity, in order to verify or complete the money transfer transaction; and a second money transfer control system that controls the compliance of transactions, the second money transfer control system including conformance data for predetermined criteria for assessing transactions and requesting further information if a transaction is not in conformance, and a money laundering regulation record for each country in which at least one of the plurality of agent terminals is located.

58. The computerized money transfer system of claim 57, wherein the second money transfer system is operable to block transactions meeting the predetermined criteria for assessing transactions.

59. A computerized money transfer system capable of implementing a money transfer service for transferring money between a sender and at least one receiver, using a sending terminal and at least one receiving terminal, the computerized money transfer system including a computerized money transfer control system that solely controls and implements a money transfer transaction in the money transfer service, the money transfer control system comprising:

a central database that stores data relating to money transfer operations;

a transaction processor coupled to the database and that executes money transfer functions;

a transaction data store that stores transaction data; a communication connection coupled to the transaction processor and to communicate with a plurality of terminals over a communications network, including at least one terminal being governed by different money transfer regulations than the transaction processor, the communication connection electronically receives money transfer instruction from a sending terminal that is part of a first organization and sends money transfer instruction to at least one receiving terminal that is part of a second organization that is unrelated to the first organization, as approved by the transaction processor;

wherein the central database stores at least data relating to money transfer regulations for each country in which a terminal resides that can interact with the transaction processor over the communication connection;

wherein the transaction processor retrieves money transfer regulations from the central database that are required for each transaction and applies the money transfer regulations for each terminal involved in the transaction including requesting additional transaction data required by at least one of the terminals and the money transfer regulations of the transaction processor;

wherein the transaction processor applies credit control for each terminal involved in the transaction;

wherein the transaction processor conducts accounting for each terminal involved in the transaction;

wherein the communication connections enables the transaction processor to implement and carry out the money transfer transaction between the sending terminal and the at least one receiving terminal such that the sending terminal communicates with the transaction processor, and the at least one receiving terminal communicates with the money transaction processor;

wherein the sending terminal is not required to communicate directly with or send information directly to the at least one receiving terminal in order to verify or complete the money transfer transaction; and a money laundering interface coupled to at least one of the transaction processor and the central database.

60. A computerized money transfer system capable of implementing a money transfer service for transferring money from a sending entity to at least one receiving entity, comprising:

a plurality of agent terminals that are operated by agents of the money transfer service, said agent terminals being interconnected by a communications network;

a money transfer control system connected to the communications network, wherein the money transfer control system solely controls and implements a money transfer transaction in the money transfer service, the money transfer control system including an agent account data store storing account data for each agent, and a transaction data store storing transaction data for transactions by agents implementing money transfers from a sending entity to at least one receiving entity, wherein the money transfer control system is positioned in a first location with first money transfer regulations;

wherein at least one of said agent terminals, located in a second location with second money transfer regulations, which may be the same or different from the first money transfer regulations, is responsive to data, input by a sending agent instigating a money transfer requested by a sending entity to at least one receiving entity, and transmits the input data to the money transfer control system;

wherein the input data identifies the sending and receiving entity or entities, the sending agent, and at least one receiving agent that is to remit the money transferred thereto to the each receiving entity;

wherein the money transfer control system records the input data in said transaction data store as a transaction from a sending agent to at least one receiving agent for a sending, entity and at least one receiving entity with the sending agent terminal and the receiving agent terminal being in separate locations, and to update the agent account data in the agent account data store for the sending and receiving agents;

wherein the sending agent and the at least one receiving agent are a part of unaffiliated and unrelated organizations, and a money transfer transaction occurs through and is solely controlled by the money transfer control system;

wherein the money transfer control system carries out the money transfer transaction between the sending agent and the at least one receiving agent such that the sending agent communicates with the money transfer control system, and the at least one receiving agent communicates with the money transfer control system; and wherein neither the sending entity nor the sending agent is required to communicate directly with or send information directly to either one of the at least one receiving agent and the at least one receiving entity, in order to verify or complete the money transfer transaction.

* * * * *